United States Patent
Amemiya et al.

(10) Patent No.: US 11,518,718 B2
(45) Date of Patent: Dec. 6, 2022

(54) CUBIC BORON NITRIDE SINTERED MATERIAL

(71) Applicants: SUMITOMO ELECTRIC INDUSTRIES, LTD., Osaka (JP); SUMITOMO ELECTRIC HARDMETAL CORP., Hyogo (JP)

(72) Inventors: Mayu Amemiya, Osaka (JP); Katsumi Okamura, Osaka (JP); Akito Ishii, Osaka (JP); Satoru Kukino, Hyogo (JP); Hironari Moroguchi, Hyogo (JP)

(73) Assignees: Sumitomo Electric Industries, Ltd., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 17/626,051

(22) PCT Filed: Jul. 17, 2020

(86) PCT No.: PCT/JP2020/027904
§ 371 (c)(1),
(2) Date: Jan. 10, 2022

(87) PCT Pub. No.: WO2021/010477
PCT Pub. Date: Jan. 21, 2021

(65) Prior Publication Data
US 2022/0204412 A1    Jun. 30, 2022

(30) Foreign Application Priority Data
Jul. 18, 2019  (JP) .............. JP2019-133028

(51) Int. Cl.
*C04B 35/5831*    (2006.01)
*C04B 35/5835*    (2006.01)
*C04B 35/645*    (2006.01)

(52) U.S. Cl.
CPC ........ *C04B 35/5831* (2013.01); *C04B 35/645* (2013.01)

(58) Field of Classification Search
CPC .... C04B 2235/3217; C04B 2235/3225; C04B 2235/3246; C04B 2235/386;
(Continued)

(56) References Cited

FOREIGN PATENT DOCUMENTS

EP    0228693 A    7/1987
EP    0598140 A    5/1994
(Continued)

OTHER PUBLICATIONS

Copending U.S Appl. No 17/626,064 (National Stage of PCT/JP2020/027905), entitled "Cubic Boron Nitride Sintered Material", filed concurrently herewith.
(Continued)

*Primary Examiner* — Shuangyi Abu Ali
(74) *Attorney, Agent, or Firm* — Renner, Otto, Boisselle & Sklar, LLP

(57) ABSTRACT

A cubic boron nitride sintered material includes: 20 t to 80 volume % of cBN grains; and 20 to 80 volume % of a binder phase, wherein the binder phase includes first binder grains and second binder grains, in each of the first binder grains, a ratio of the number of atoms of the first metal element to a total of the number of atoms of the titanium and the first metal element is more than or equal to 0.01% and less than 10%, in each of the second binder grains, the ratio is more than or equal to 10% and less than or equal to 80%, and an average grain size of the second binder grains is more than or equal to 0.2 μm and less than or equal to 1 μm.

6 Claims, 7 Drawing Sheets

(58) Field of Classification Search
CPC ........ C04B 2235/443; C04B 2235/444; C04B 2235/449; C04B 2235/5436; C04B 2235/5445; C04B 2235/6562; C04B 2235/6567; C04B 2235/722; C04B 2235/785; C04B 2235/786; C04B 35/119; C04B 35/488; C04B 35/4885; C04B 35/5831; C04B 35/6267; C04B 35/62685; C04B 35/645
See application file for complete search history.

(56) References Cited

FOREIGN PATENT DOCUMENTS

| | | | |
|---|---|---|---|
| EP | 3578534 | A | 12/2019 |
| JP | 9-136203 | A | 5/1997 |
| JP | 2003-236710 | A | 8/2003 |
| JP | 2007-254249 | A | 10/2007 |
| JP | 2014-214065 | A | 11/2014 |
| JP | 2017-030082 | A | 2/2017 |
| WO | 2019/087481 | A1 | 5/2019 |

OTHER PUBLICATIONS

Office Action dated Jun. 13, 2022 in corresponding U.S. Appl. No. 17/626,064.
Notice of Allowance dated Aug. 26, 2022 in corresponding U.S. Appl. No. 17/626,064.

CUBIC BORON NITRIDE SINTERED MATERIAL

TECHNICAL FIELD

The present disclosure relates to a cubic boron nitride sintered material. The present application claims a priority based on Japanese Patent Application No. 2019-133028 filed on Jul. 18, 2019, the entire content of which is incorporated herein by reference.

BACKGROUND ART

A cubic boron nitride sintered material (hereinafter, also referred to as "cBN sintered material") is a high-hardness material used for cutting tools and the like. The cBN sintered material is normally constituted of cubic boron nitride grains (hereinafter, also referred to as "cBN grains") and a binder phase. Depending on a content ratio of the cBN grains and a composition of the binder phase, characteristics of the cBN sintered material tend to differ.

Hence, in the field of cutting, different types of cBN sintered materials are applied to cutting tools in accordance with the material of a workpiece, required precision in processing, or the like.

For example, as a cBN sintered material that can be used for intermittent cutting of a high-hardness steel, Japanese Patent Laying-Open No. 2017-030082 (PTL 1) discloses a cubic boron nitride sintered material including cubic boron nitride grains and a TiC phase serving as a binder phase.

CITATION LIST

Patent Literature

PTL 1: Japanese Patent Laying-Open No. 2017-030082

SUMMARY OF INVENTION

A cubic boron nitride sintered material according to the present disclosure is a cubic boron nitride sintered material including: more than or equal to 20 volume % and less than or equal to 80 volume % of cubic boron nitride grains; and more than or equal to 20 volume % and less than or equal to 80 volume % of a binder phase, wherein the binder phase includes first binder grains and second binder grains, each of the first binder grains and the second binder grains includes one compound composed of titanium, at least one first metal element selected from a group consisting of zirconium, hafnium, a group 5 element, a group 6 element in a periodic table, and aluminum, and one or both of nitrogen and carbon, in each of the first binder grains, a ratio of the number of atoms of the first metal element to a total of the number of atoms of the titanium and the number of atoms of the first metal element is more than or equal to 0.01% and less than 10%, in each of the second binder grains, a ratio of the number of atoms of the first metal element to a total of the number of atoms of the titanium and the number of atoms of the first metal element is more than or equal to 10% and less than or equal to 80%, and an average grain size of the second binder grains is more than or equal to 0.2 μm and less than or equal to 1 μm.

DETAILED DESCRIPTION

Figure 1:
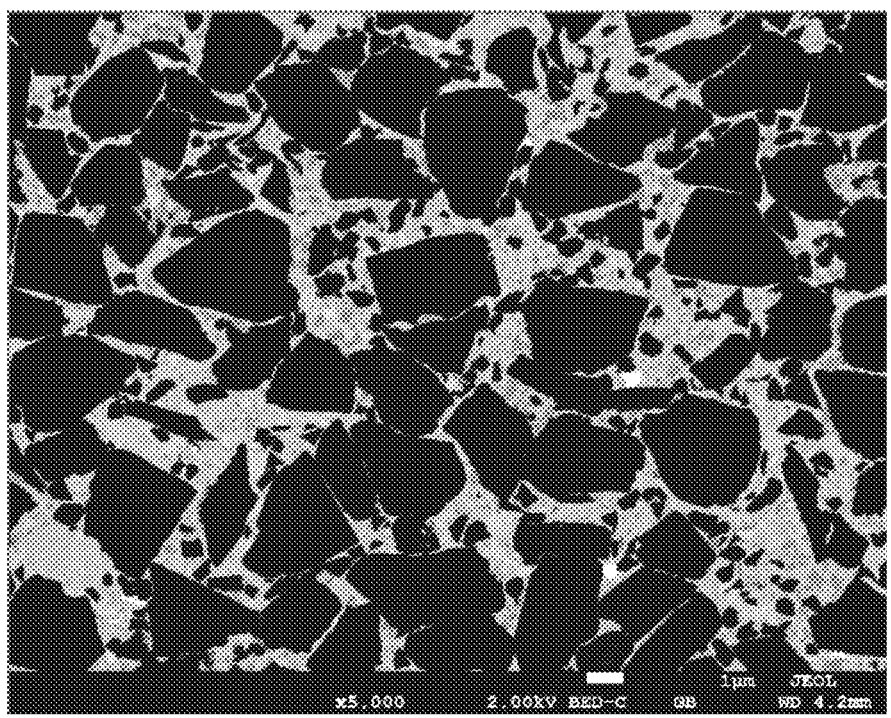
FIG. 1 shows an image showing an exemplary reflected electron image obtained by observing a cBN sintered material according to the present disclosure using a SEM.

Problem to be Solved by the Present Disclosure

A hardened steel having high strength and toughness has been used for gears, shafts, and bearing components of automobiles. In recent years, these components have been required to have mechanical characteristics to endure higher torque. In order to improve the mechanical characteristics of the hardened steel, a high-strength hardened steel has been developed in which hard grains are dispersed in a hardened steel base material, for example.

Since the high-strength hardened steel has a very high hardness, it is very difficult to process the high-strength hardened steel using a tool. In particular, in the case of high-efficiency processing, there has been required a tool having a tool life that is less likely to be decreased due to breakage.

The present disclosure has an object to provide a cubic boron nitride sintered material that can attain a long life of a tool particularly in high-efficiency processing of a high-strength hardened steel when used as a tool material.

Advantageous Effect of the Present Disclosure

The cubic boron nitride sintered material according to the present disclosure can attain a long life of a tool particularly in high-efficiency processing of a high-strength hardened steel when used as a tool material.

Description of Embodiments

First, embodiments of the present disclosure are listed and described.

(1) A cubic boron nitride sintered material according to the present disclosure is a cubic boron nitride sintered material including: more than or equal to 20 volume % and less than or equal to 80 volume % of cubic boron nitride grains; and more than or equal to 20 volume % and less than or equal to 80 volume % of a binder phase, wherein the binder phase includes first binder grains and second binder grains, each of the first binder grains and the second binder grains includes one compound composed of titanium, at least one first metal element selected from a group consisting of zirconium, hafnium, a group 5 element, a group 6 element in a periodic table, and aluminum, and one or both of nitrogen and carbon, in each of the first binder grains, a ratio of the number of atoms of the first metal element to a total of the number of atoms of the titanium and the number of atoms of the first metal element is more than or equal to 0.01% and less than 10%, in each of the second binder grains, a ratio of the number of atoms of the first metal element to a total of the number of atoms of the titanium and the number of atoms of the first metal element is more than or equal to 10% and less than or equal to 80%, and an average grain size of the second binder grains is more than or equal to 0.2 μm and less than or equal to 1 μm.

The cubic boron nitride sintered material according to the present disclosure can attain a long life of a tool particularly in high-efficiency processing of a high-strength hardened steel when used as a tool material.

(2) The average grain size of the second binder grains is preferably more than or equal to 0.25 μm and less than or equal to 0.7 μm. Thus, the cubic boron nitride sintered material according to the present disclosure can maintain excellent toughness and heat conductivity.

(3) A ratio of a mass of the first binder grains to a total mass of the first binder grains and the second binder grains is preferably more than or equal to 10% and less than or equal to 95%. Thus, in the cubic boron nitride sintered material, breakage resistance and wear resistance are improved in a well-balanced manner.

(4) A ratio of a mass of the first binder grains to a total mass of the first binder grains and the second binder grains is preferably more than or equal to 50% and less than or equal to 80%. Thus, in the cubic boron nitride sintered material, the breakage resistance and the wear resistance are further improved in a well-balanced manner.

(5) The first metal element preferably consists of at least one metal element selected from a group consisting of zirconium, hafnium, niobium, tantalum, molybdenum, and tungsten. Thus, in the cubic boron nitride sintered material, the breakage resistance and the wear resistance are improved in a well-balanced manner.

(6) The first metal element preferably consists of one or both of zirconium and niobium. Thus, in the cubic boron nitride sintered material, the breakage resistance and the wear resistance are further improved in a well-balanced manner.

(7) A content ratio of the cubic boron nitride grains is preferably more than or equal to 35 volume % and less than or equal to 75 volume %. Thus, in the cubic boron nitride sintered material, the breakage resistance and the wear resistance are improved in a well-balanced manner.

Details of Embodiments of the Present Disclosure

Specific examples of the cubic boron nitride sintered material according to the present disclosure will be described below with reference to figures. In the figures of the present disclosure, the same reference characters denote the same or corresponding portions. Further, a relation of such a dimension as a length, a width, a thickness, or a depth is modified as appropriate for clarity and brevity of the figures and does not necessarily represent an actual dimensional relation.

In the present specification, the expression "A to B" represents a range of lower to upper limits (i.e., more than or equal to A and less than or equal to B). When no unit is indicated for A and a unit is indicated only for B, the unit of A is the same as the unit of B.

Moreover, when a compound or the like is expressed by a chemical formula in the present specification and an atomic ratio is not particularly limited, it is assumed that all the conventionally known atomic ratios are included. The atomic ratio should not be necessarily limited only to one in the stoichiometric range. For example, when "TiNbCN" is described, an atomic ratio in the TiNbCN include all the conventionally known atomic ratios. The same also applies to compounds other than the "TiNbCN".

First Embodiment: Cubic Boron Nitride Sintered Material

A cubic boron nitride sintered material according to the present disclosure is a cubic boron nitride sintered material including: more than or equal to 20 volume % and less than or equal to 80 volume % of cubic boron nitride grains; and more than or equal to 20 volume % and less than or equal to 80 volume % of a binder phase, wherein the binder phase includes first binder grains and second binder grains, each of the first binder grains and the second binder grains includes one compound composed of titanium, at least one first metal element selected from a group consisting of zirconium, hafnium, a group 5 element, a group 6 element in a periodic table, and aluminum, and one or both of nitrogen and carbon, in each of the first binder grains, a ratio of the number of atoms of the first metal element to a total of the number of atoms of the titanium and the number of atoms of the first metal element is more than or equal to 0.01% and less than 10%, in each of the second binder grains, a ratio of the number of atoms of the first metal element to a total of the number of atoms of the titanium and the number of atoms of the first metal element is more than or equal to 10% and less than or equal to 80%, and an average grain size of the second binder grains is more than or equal to 0.2 μm and less than or equal to 1 μm.

The cubic boron nitride sintered material according to the present disclosure can attain a long life of a tool particularly in high-efficiency processing of a high-strength hardened steel when used as a tool material. Although reasons therefor are unknown, the following reasons (i) to (iv) are presumed.

(i) The cubic boron nitride sintered material according to the present disclosure includes more than or equal to 20 volume % and less than or equal to 80 volume % of the cubic boron nitride grains each having excellent strength and toughness. Therefore, the cBN sintered material can also have excellent strength and toughness. Therefore, a tool employing the cubic boron nitride sintered material can have a long tool life even in high-efficiency processing of a high-strength hardened steel.

(ii) In the cubic boron nitride sintered material according to the present disclosure, each of the first binder grains and the second binder grains included in the binder phase includes one compound (hereinafter, also referred to as a "binder phase compound") composed of titanium, at least one first metal element selected from a group consisting of zirconium, hafnium, a group 5 element, a group 6 element in a periodic table, and aluminum, and one or both of nitrogen and carbon. The binder phase compound is formed in the following manner: the first metal element, which is different from titanium (Ti) in terms of atomic radius, is dissolved in a solid state in TiN, TiC, or TiCN, each of which has been used for a conventional binder phase. Therefore, a multiplicity of lattice defects (dislocations or stacking faults) are introduced in the binder phase compound.

When there is a lattice defect in the binder phase compound, energy of progress of crack generated during use of the tool is absorbed in a misaligned part of atoms of the lattice defect, thus presumably resulting in suppressed propagation of crack. Therefore, the tool employing the cubic boron nitride sintered material can have a long tool life even in high-efficiency processing of a high-strength hardened steel.

(iii) In the cubic boron nitride sintered material according to the present disclosure, the first binder grains and the second binder grains included in the binder phase are different in terms of the ratio of the number of atoms of the first metal element to the total of the number of atoms of titanium and the number of atoms of the first metal element. Therefore, each of the first binder grains and each of the second binder grains have different lattice constants. It is considered that when the first binder grain and the second binder grain having different lattice constants are in contact with each other in the binder phase, lattice defects are increased not only in the binder grains but also in the vicinity of an interface at which the first binder grain and the second binder grain are in contact with each other.

In the cubic boron nitride sintered material according to the present disclosure, since the binder phase has lattice defects, propagation of crack is suppressed in the binder phase, thus resulting in improved breakage resistance. Therefore, the tool employing the cubic boron nitride sintered material can have a long tool life even in high-efficiency processing of a high-strength hardened steel.

(iv) In the conventional cubic boron nitride sintered material, in order to secure high strength, each of the binder grains has a fine grain size of about 0.1 μm. With the binder grains having such fine grain sizes, the strength of the binder phase is improved; however, the toughness and the heat conductivity tend to be decreased.

In the cubic boron nitride sintered material according to the present disclosure, the average grain size of the second binder grains included in the binder phase is more than or equal to 0.2 μm and less than or equal to 1 μm. Since the second binder grains have very high strength, high strength can be secured even when the average grain size is larger than that of the conventional one. Further, when the grain size of each of the second binder grains is large, the toughness and heat conductivity of the binder phase are also improved. Therefore, a tool employing the cubic boron nitride sintered material exhibits excellent breakage resistance even in high-efficiency processing of a high-strength hardened steel, and can have a long tool life.

<<Composition>>

The cubic boron nitride sintered material according to the present disclosure includes: more than or equal to 20 volume % and less than or equal to 80 volume % of the cubic boron nitride grains; and more than or equal to 20 volume % and less than or equal to 80 volume % of the binder phase. The cBN sintered material can consist of the cBN grains and the binder phase. Further, the cBN sintered material can include an inevitable impurity resulting from a source material, a manufacturing condition, or the like. The content ratio of the cBN grains in the cBN sintered material is preferably more than or equal to 35 volume % and less than or equal to 75 volume %, and is more preferably more than or equal to 45 volume % and less than or equal to 74.5 volume %. The content ratio of the binder phase in the cBN sintered material is preferably more than or equal to 25 volume % and less than or equal to 65 volume %, and is more preferably more than or equal to 25.5 volume % and less than or equal to 55 volume %. In the cubic boron nitride sintered material according to the present disclosure, the total of the content ratio of the cBN grains, the content ratio of the binder phase, and the content ratio of the inevitable impurity is 100 volume %.

In the cubic boron nitride sintered material according to the present disclosure, the lower limit of the total of the content ratio of the cBN grains and the content ratio of the binder phase can be more than or equal to 95 volume %, can be more than or equal to 96 volume %, can be more than or equal to 97 volume %, can be more than or equal to 98 volume %, or can be more than or equal to 99 volume %. In the cubic boron nitride sintered material according to the present disclosure, the upper limit of the total of the content ratio of the cBN grains and the content ratio of the binder phase can be less than or equal to 100 volume %, or can be less than 100 volume %. In the cubic boron nitride sintered material according to the present disclosure, the total of the content ratio of the cBN grains and the content ratio of the binder phase can be more than or equal to 95 volume % and less than or equal to 100 volume %, can be more than or equal to 96 volume % and less than or equal to 100 volume %, can be more than or equal to 97 volume % and less than or equal to 100 volume %, can be more than or equal to 98 volume % and less than or equal to 100 volume %, can be more than or equal to 99 volume % and less than or equal to 100 volume %, can be more than or equal to 95 volume % and less than 100 volume %, can be more than or equal to 96 volume % and less than 100 volume %, can be more than or equal to 97 volume % and less than 100 volume %, can be more than or equal to 98 volume % and less than 100 volume %, or can be more than or equal to 99 volume % and less than 100 volume %.

The content ratio (volume %) of the cBN grains and the content ratio (volume %) of the binder phase in the cBN sintered material can be confirmed by performing structure observation, element analysis, and the like onto the cBN sintered material using an energy dispersive X-ray analysis device (EDX) ("Octane Elect EDS system" (trademark)) accompanied with a scanning electron microscope (SEM) ("JSM-7800F" (trademark) provided by JEOL).

Specifically, the content ratio (volume %) of the cBN grains can be found as follows. First, the cBN sintered material is cut at an arbitrary location to produce a specimen including a cross section of the cBN sintered material. For the formation of the cross section, a focused ion beam device, a cross section polisher device, or the like can be used. Next, the cross section is observed by the SEM at a magnification of 5000× to obtain a reflected electron image. In the reflected electron image, the cBN grains look black (dark fields) and a region having the binder phase existing therein is gray or white (bright fields).

Next, the reflected electron image is subjected to binarization processing using image analysis software (for example, "WinROOF" provided by Mitani Corporation). From the image having been through the binarization processing, the area ratio of pixels originated from the dark fields (pixels originated from the cBN grains) in the area of the measurement visual field is calculated. The calculated area ratio is regarded as volume %, thereby finding the content ratio (volume %) of the cBN grains.

From the image having been through the binarization processing, the area ratio of pixels originated from the bright fields (pixels originated from the binder phase) in the area of the measurement visual field is calculated, thereby finding the content ratio (volume %) of the binder phase.

A specific method of the binarization processing will be described with reference to FIGS. 1 to 6.

Figure 2:
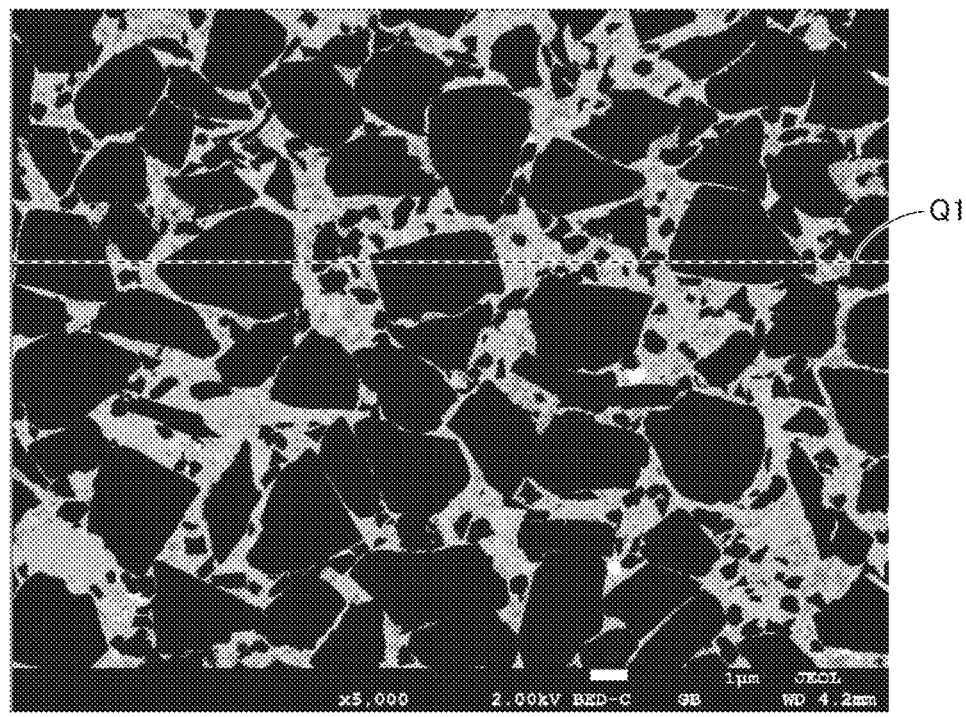
FIG. 2 shows an image obtained by loading the reflected electron image of FIG. 1 into image processing software.

FIG. 1 shows an exemplary reflected electron image obtained by observing the cBN sintered material using the SEM. The reflected electron image is loaded into image processing software. The loaded image is shown in FIG. 2. As shown in FIG. 2, an arbitrary line Q1 is drawn in the loaded image.

Figure 3:
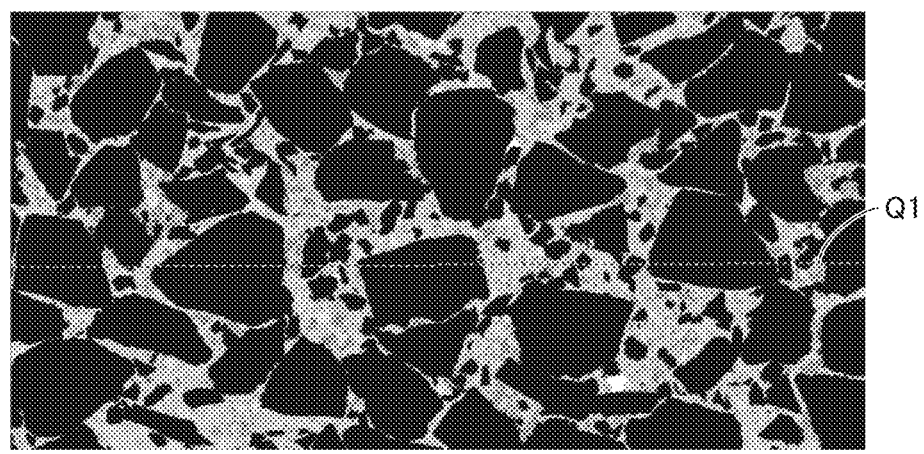
FIG. 3 shows an upper image that is the reflected electron image, and shows a lower image that is a concentration cross section graph obtained from the reflected electron image.
Figure 3:
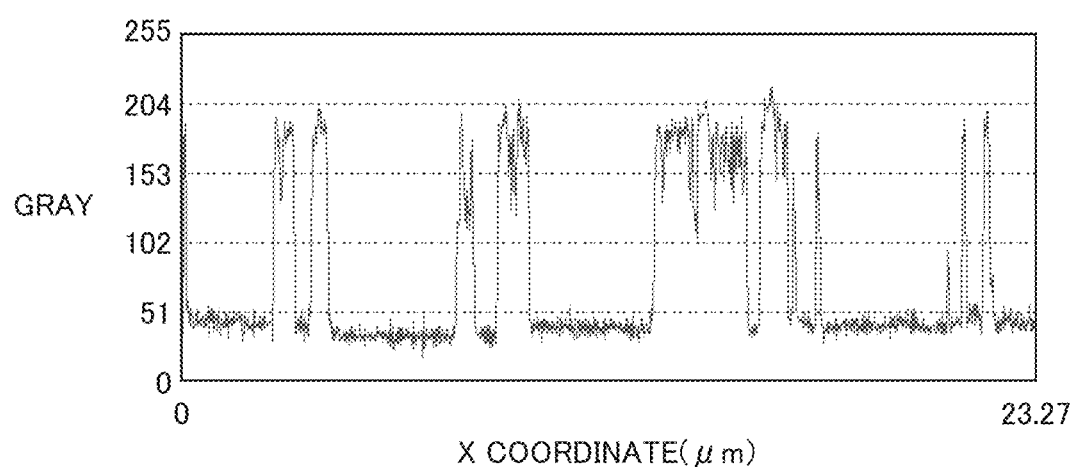
Figure 4:
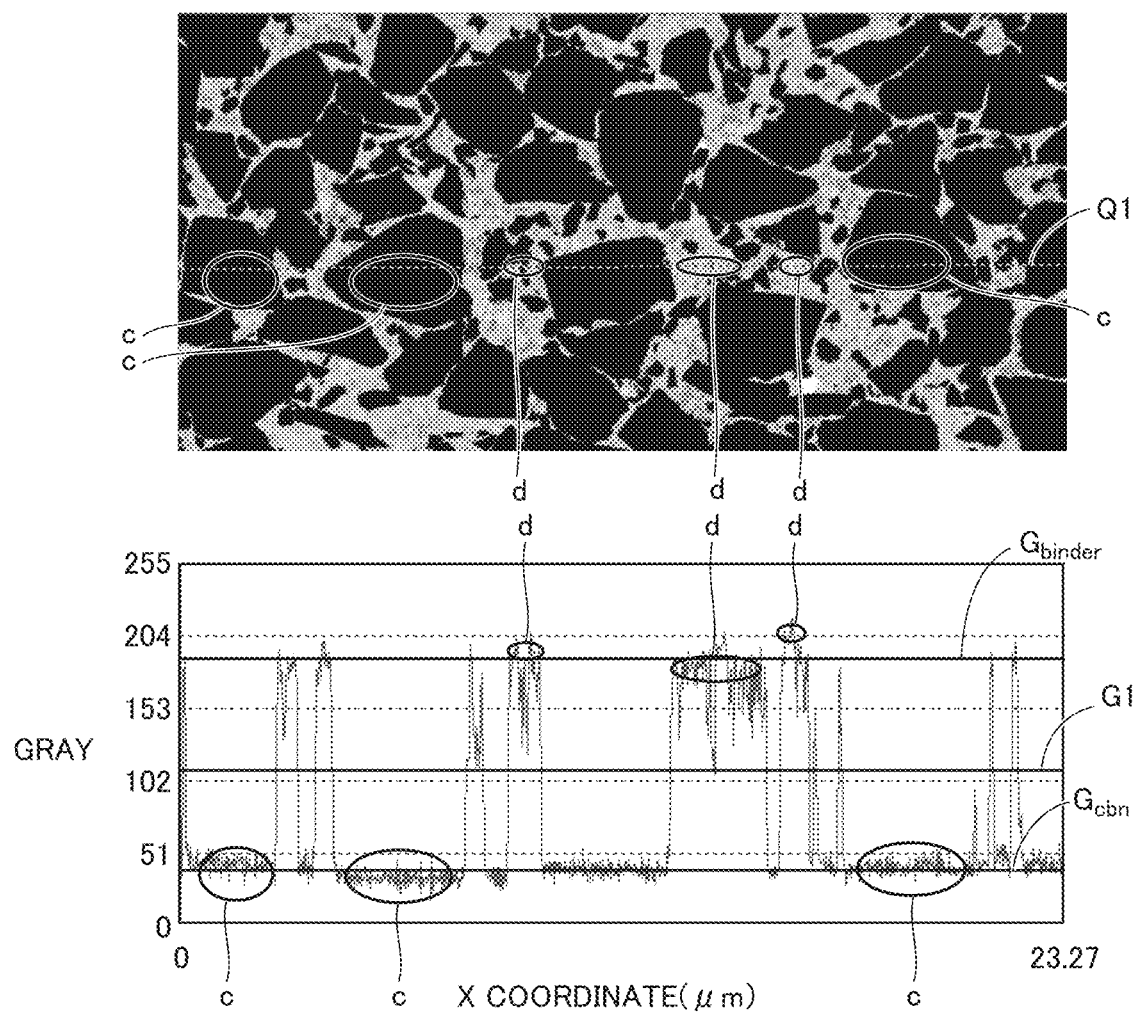
FIG. 4 is a diagram for illustrating a method of defining a black region and a binder phase.
Figure 5:
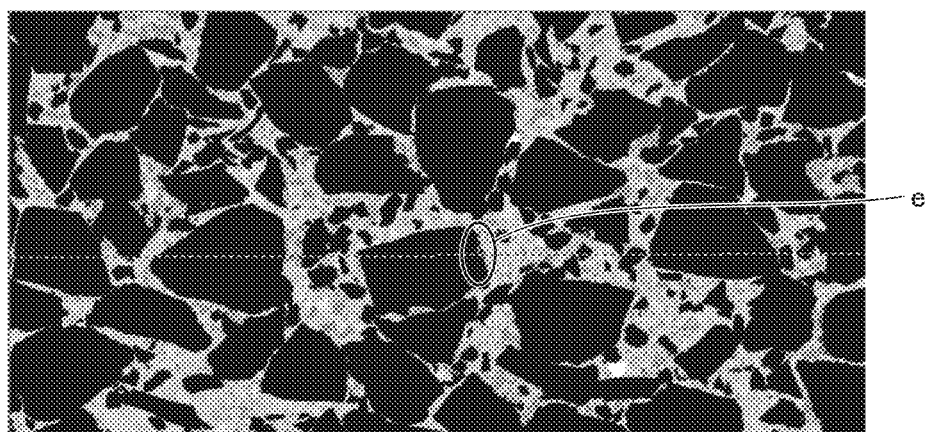
FIG. 5 is a diagram for illustrating a boundary between the black region and the binder phase.
Figure 5:
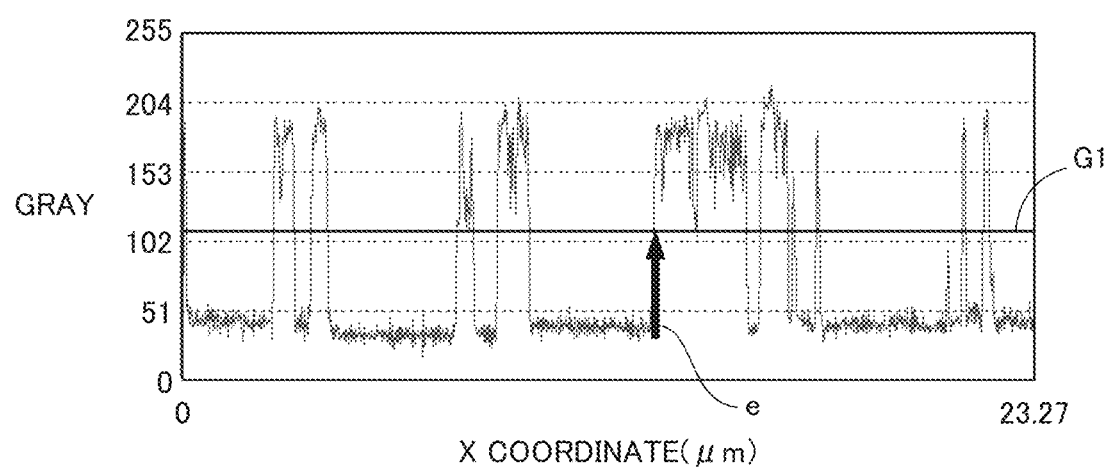

A concentration is measured along line Q1 in the cross sectional view, and a GRAY value is read. A graph (hereinafter, also referred to as a "concentration cross section graph") is prepared with the X coordinate representing line Q1 and the Y coordinate representing the GRAY value. FIG. 3 shows the reflected electron image of the cBN sintered material and the concentration cross section graph of the reflected electron image (the upper image corresponds to the reflected electron image and the lower graph corresponds to the concentration cross section graph). In FIG. 3, the width of the reflected electron image coincides with the width (23.27 µm) of the X coordinate of the concentration cross section graph. Hence, a distance from the left end portion of line Q1 to a specific position on line Q1 in the reflected electron image is represented by a value of the X coordinate in the concentration cross section graph.

In the reflected electron image of FIG. 3, a region looking black and having cBN grains existing therein is arbitrarily selected at three locations. The region looking black corresponds to, for example, portions indicated by ellipses each denoted by a reference character "c" in the reflected electron image of FIG. 4.

The GRAY values of the region looking black at the three locations are read from the concentration cross section graph. The GRAY value of the region looking black at each of the three locations is the average value of the GRAY values of portions surrounded by a corresponding ellipse denoted by reference character "c" in the concentration cross section graph of FIG. 4. The average value of the GRAY values at the three locations is calculated. This average value is defined as "cBN GRAY value" (hereinafter, also referred to as "$G_{cbn}$").

In the reflected electron image of FIG. 3, a region in which the binder phase indicated by a gray color exists is arbitrarily selected at three locations. The binder phase corresponds to, for example, portions indicated by ellipses denoted by a reference character "d" in the reflected electron image of FIG. 4.

The GRAY values of the binder phase at the three locations are read from the concentration cross section graph. The GRAY value of the binder phase at each of the three locations is the average value of the GRAY values of portions at a corresponding one of the three locations surrounded by the ellipses denoted by reference character "d" in the concentration cross section graph of FIG. 4. The average value of the GRAY values at the three locations is calculated. This average value is defined as "binder phase GRAY value" (hereinafter, also referred to as "$G_{binder}$").

A GRAY value indicated by $(G_{cbn}+G_{binder})/2$ is defined as the GRAY value of an interface between each cBN grain (region looking black) and the binder phase. For example, in the concentration cross section graph of FIG. 4, GRAY value $G_{cbn}$ of the cBN grains (region looking black) is indicated by a line $G_{cbn}$, GRAY value $G_{binder}$ of the binder phase is indicated by a line $G_{binder}$, and the GRAY value indicated by $(G_{cbn}+G_{binder})/2$ is indicated by a line G1.

By defining the cBN grains (region looking black) and the binder phase as described above, the values of the X coordinate and the Y coordinate at the interface between the cBN grain (region looking black) and the binder phase can be read in the concentration cross section graph. The interface can be arbitrarily defined. For example, in a reflected electron image at the upper part of FIG. 5, a portion surrounded by an ellipse denoted by a reference character "e" is shown as an exemplary portion including the interface. In the reflected electron image of FIG. 5, the interface between the cBN grain (region looking black) and the binder phase is, for example, the portion indicated by the ellipse denoted by reference character "e". In the concentration cross section graph at the lower part of FIG. 5, the interface, which corresponds to the ellipse denoted by the reference character "e", between the cBN grain (region looking black) and the binder phase is a portion indicated by an arrow e. The tip of arrow e indicates the position of an intersection point between the concentration cross section graph of the GRAY value and line G1 indicating the GRAY value $(G_{cbn}+G_{binder})/2$. The values of the X coordinate of the tip of arrow e and the Y coordinate of the tip of arrow e correspond to the values of the X coordinate and the Y coordinate at the interface between the cBN grain (region looking black) and the binder phase.

Figure 6:
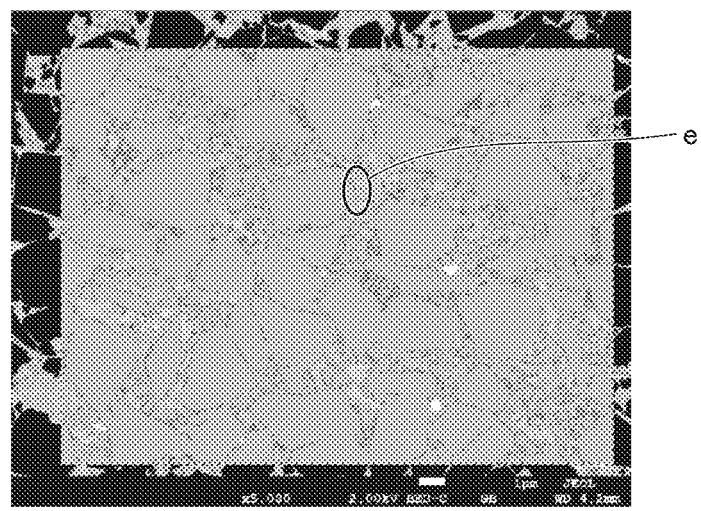
FIG. 6 shows an image obtained by performing binarization processing onto the reflected electron image of FIG. 1.

The binarization processing is performed using, as threshold values, the values of the X coordinate and the Y coordinate at the interface between the cBN grain (region looking black) and the binder phase. FIG. 6 shows an image having been through the binarization processing. In FIG. 6, a region surrounded by a dotted line is a region having been through the binarization processing. It should be noted that the image having been through the binarization processing may include not only the bright fields and the dark fields but also white regions (portions whiter than the bright fields) corresponding to the regions white in the image yet to be through the binarization processing.

In FIG. 6, the area ratio of pixels originated from the dark fields (pixels originated from the cBN grains) in the area of the measurement visual field is calculated. The calculated area ratio is regarded as volume %, thereby finding the content ratio (volume %) of the cBN grains.

In FIG. 6, the area ratio of pixels originated from the bright fields (pixels originated from the binder phase) in the area of the measurement visual field is calculated, thereby finding the content ratio (volume %) of the binder phase.

<<cBN Grains>>

The cBN grains have high hardness, high strength, and high toughness, and serve as a base of the cBN sintered material. Median size $D_{50}$ (hereinafter, referred to as "average grain size") of the cBN grains is not particularly limited, and can be 0.1 to 10.0 µm, for example. Normally, as $D_{50}$ is smaller, the hardness of the cBN sintered material tends to be higher, and as variation in the grain sizes is smaller, the characteristics of the cBN sintered material tend to be more uniform. $D_{50}$ of the cBN grains is preferably, for example, 0.5 to 4.0 µm.

$D_{50}$ of the cBN grains is determined as follows. First, a specimen including a cross section of the cBN sintered material is formed in the same manner as in the above-described method of finding the content ratio of the cBN grains, and a reflected electron image is obtained. Next, the equivalent circle diameter of each dark field (corresponding to cBN) in the reflected electron image is calculated using image analysis software ("WinROOF (ver.7.4.5)") provided by Mitani Corporation). It is preferable to calculate the equivalent circle diameters of 100 or more cBN grains by performing observation in five or more visual fields.

Next, the equivalent circle diameters are arranged in an ascending order from the minimum value to the maximum value to find a cumulative distribution. $D_{50}$ represents a grain size corresponding to a cumulative area of 50% in the cumulative distribution. It should be noted that the equivalent circle diameter refers to the diameter of a circle having the same area as the area of the measured cBN grain.

<<Binder Phase>>

The binder phase serves to allow the cBN grains, each of which is a material difficult to be sintered, to be sintered at industrial levels of pressure and temperature. Moreover, reactivity of the binder phase with respect to iron is lower than that of cBN. Hence, in cutting of a high-strength hardened steel, the binder phase additionally works to suppress chemical wear and thermal wear. Moreover, when the cBN sintered material contains the binder phase, wear resistance in high-efficient processing of a high-strength hardened steel is improved.

In the cBN sintered material according to the present disclosure, the binder phase includes the first binder grains and the second binder grains. Each of the first binder grains and the second binder grains includes one compound composed of titanium, the at least one first metal element selected from the group consisting of zirconium, hafnium, the group 5 element, the group 6 element in the periodic table, and aluminum, and one or both of nitrogen and carbon, in each of the first binder grains, the ratio of the number of atoms of the first metal element to the total of the number of atoms of titanium and the number of atoms of the first metal element is more than or equal to 0.01% and less than 10%, and in each of the second binder grains, the ratio of the number of atoms of the first metal element to the total of the number of atoms of titanium and the number of atoms of the first metal element is more than or equal to 10% and less than or equal to 80%. The first binder grain and the second binder grain are different from each other in terms of the ratio of the number of atoms of the first metal element to the total of the number of atoms of titanium and the number of atoms of the first metal element.

Here, the group 5 element in the periodic table includes vanadium (V), niobium (Nb), and tantalum (Ta), for example. The group 6 element includes chromium (Cr), molybdenum (Mo), and tungsten (W), for example.

The first metal element preferably consists of at least one metal element selected from a group consisting of zirconium, hafnium, niobium, tantalum, molybdenum, and tungsten.

Examples of the compound (nitride) including titanium, the first metal element, and nitrogen include titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), and the like.

Examples of the compound (carbide) including titanium, the first metal element, and carbon include titanium zirconium carbide (TiZrC), titanium hafnium carbide (TiHfC), titanium vanadium carbide (TiVC), titanium niobium carbide (TiNbC), titanium tantalum carbide (TiTaC), titanium chromium carbide (TiCrC), titanium molybdenum carbide (TiMoC), titanium tungsten carbide (TiWC), titanium aluminum carbide (TiAlC, $Ti_2AlC$, $Ti_3AlC$), and the like.

Examples of the compound (carbonitride) including titanium, the first metal element, carbon and nitrogen include titanium zirconium carbonitride (TiZrCN), titanium hafnium carbonitride (TiHfCN), titanium vanadium carbonitride (TiVCN), titanium niobium carbonitride (TiNbCN), titanium tantalum carbonitride (TiTaCN), titanium chromium carbonitride (TiCrCN), titanium molybdenum carbonitride (TiMoCN), titanium tungsten carbonitride (TiWCN), titanium aluminum carbonitride (TiAlCN, $Ti_2AlCN$, $Ti_3AlCN$), and the like.

Each of the first binder grains and the second binder grains can consist only of the binder phase compound. Alternatively, each of the first binder grains and the second binder grains can include other component(s) in addition to the binder phase compound. Examples of element(s) of the other component(s) include nickel (Ni), iron (Fe), manganese (Mn) and rhenium (Re).

The binder phase can include a solid solution originated from the compound described above. Here, the solid solution originated from the compound refers to a state in which two or more of the compounds illustrated above are dissolved in the crystal structures of the compounds, and refers to an interstitial solid solution or a substitutional solid solution.

The binder phase can consist only of the first binder grains and the second binder grains. Alternatively, the binder phase can include other component(s) in addition to the first binder grains and the second binder grains. Examples of element(s) of the other component(s) include nickel (Ni), iron (Fe), manganese (Mn) and rhenium (Re).

The composition of the whole of the binder phase included in the cBN sintered material can be confirmed by combining structure observation, element analysis, and the like with crystal structure analysis and the like. The structure observation, element analysis, and the like use an energy dispersive X-ray analysis device (EDX) ("Octane Elect EDS system" (trademark)) accompanied with a scanning electron microscope (SEM) ("JSM-7800F" (trademark) provided by JEOL), and the crystal structure analysis and the like use XRD (X-ray diffraction measurement) (device: "MiniFlex 600" (trademark) provided by RIGAKU).

In each of the first binder grains, the ratio of the number of atoms of the first metal element to the total of the number of atoms of titanium and the number of atoms of the first metal element is more than or equal to 0.01% and less than 10%. When the ratio of the number of atoms of the first metal element is more than or equal to 0.01% and less than 10%, a difference in lattice constant between the first binder grain and the second binder grain becomes large. In this case, when the first binder grain and the second binder grain are in contact with each other, lattice defects are further introduced into the vicinity of the interface at which the first binder grain and the second binder grain are in contact with each other, thereby significantly improving the breakage resistance of the cubic boron nitride sintered material. Further, when the ratio of the number of atoms of the first metal element is less than 10%, the wear resistance of the first binder grains is improved, with the result that the breakage resistance and the wear resistance are improved in the cubic boron nitride sintered material in a well-balanced manner.

In each of the first binder grains, the ratio of the number of atoms of the first metal element to the total of the number of atoms of titanium and the number of atoms of the first metal element is preferably more than or equal to 0.02% and less than or equal to 5%, and is more preferably more than or equal to 0.05% and less than or equal to 3%.

In each of the second binder grains, the ratio of the number of atoms of the first metal element to the total of the number of atoms of titanium and the number of atoms of the first metal element is more than or equal to 10% and less than or equal to 80%. When the ratio of the number of atoms of the first metal element is more than or equal to 10%, lattice defects in the second binder grains are increased to suppress propagation of crack in the binder phase, thereby significantly improving the breakage resistance of the cubic boron nitride sintered material. When the ratio of the number of atoms of the first metal element is less than or equal to 80%, the second binder grains can have excellent strength, thereby improving the strength of the cubic boron nitride sintered material.

In each of the second binder grains, the ratio of the number of atoms of the first metal element to the total of the number of atoms of titanium and the number of atoms of the first metal element is preferably more than or equal to 11.5% and less than or equal to 60%, and is more preferably more than or equal to 13% and less than or equal to 50%.

In (1-1) to (1-5), the following describes: a procedure of a method of measuring the compositions of the first binder grain and the second binder grain; and a procedure of a method of measuring the ratio (hereinafter, also referred to as "the ratio of the first metal element") of the number of atoms of the first metal element to the total of the number of atoms of titanium and the number of atoms of the first metal element in each of the first binder grain and the second binder grain.

(1-1) A sample is obtained from the cBN sintered material, and is sliced to have a thickness of 30 to 100 nm using an argon ion slicer (provided by JEOL), thereby producing a cut piece. The cut piece is observed using a transmission electron microscope ("JEM-F200" (trade name) provided by JEOL; hereinafter, also referred to as "TEM") at a magnification of 50,000×, thereby obtaining a first image. In the first image, the cBN grains are observed as black, and the interface between the binder phase and each grain is observed as white or gray.

(1-2) A region other than the cBN grains (black) in the first image is positioned at the center of the visual field and observation is performed at an observation magnification changed to 100,000×, thereby obtaining a second image.

(1-3) Next, element mapping analysis by EDX is performed onto the second image to analyze distributions of titanium, the first metal element, carbon, and nitrogen.

(1-4) In the element mapping image of the first metal element, a point at which the intensity of a signal of the first metal element is maximum (analysis range: about 2 nm) and a point at which the intensity of the signal of the first metal element is minimum (analysis range: about 2 nm) are specified, and it is confirmed that more than or equal to 15 atomic % of boron does not exist in each of the regions. When more than or equal to 15 atomic % of boron exists, the regions are not regarded as the first binder grain and the second binder grain. Here, the point at which the intensity of the signal of the first metal element is maximum exists in the second binder grain, and the point at which the intensity of the signal of the first metal element is minimum exists in the first binder grain. At each of the points, quantitative analysis on titanium, the first metal element, carbon, and nitrogen is performed.

(1-5) In accordance with the result of (1-4) above, a composition at the point at which the intensity of the signal of the first metal element is maximum is specified. The composition corresponds to the composition of the second binder grain. The ratio (the ratio of the first metal element) of the number of atoms of the first metal element to the total of the number of atoms of titanium and the number of atoms of the first metal element at the point at which the intensity of the signal of the first metal element is maximum is calculated. The ratio is calculated at each of 10 or more visual fields. The average value of the ratios at the 10 or more visual fields corresponds to the ratio of the first metal element in the second binder grain.

(1-6) In accordance with the result of (1-4) above, a composition at the point at which the intensity of the signal of the first metal element is minimum is specified. The composition corresponds to the composition of the first binder grain. The ratio (the ratio of the first metal element) of the number of atoms of the first metal element to the total of the number of atoms of titanium and the number of atoms of the first metal element at the point at which the intensity of the signal of the first metal element is minimum is calculated. The ratio is calculated at each of 10 or more visual fields. The average value of the ratios at the 10 or more visual fields corresponds to the ratio of the first metal element in the first binder grain.

By the following method, it can be confirmed that the point at which the intensity of the signal of the first metal element is maximum and the point at which the intensity of the signal of the first metal element is minimum exist in different crystal grains. First, a high-angle annular dark field scanning transmission electron microscope is used to obtain an HAADF-STEM image from the same visual field as that of the first image obtained in (1-1). Further, a bright-field scanning transmission electron microscope is used to obtain a BF-STEM image from the same visual field as that of the first image obtained in (1-1).

The crystal grains are specified based on the first image, the HAADF-STEM image, and the BF-STEM image. A grain boundary between the crystal grains is specified by the following method. First, in the obtained mapping image of the first metal element (M), an image is obtained in which a region in which the M content (atomic %)/(Ti content (atomic %)+the M content (atomic %)) is less than 10% is set not to be presented. In this image, reference is made to the element mapping obtained in (1-3) so as to define, as the crystal grains, mapping regions of the first metal element (M) in which boron is not observed and so as to specify, as the crystal grain boundary, a boundary between the mapping regions of the first metal element (M).

In the cubic boron nitride sintered material according to the present disclosure, the average grain size of the second binder grains is more than or equal to 0.2 μm and less than or equal to 1 μm. Thus, the second binder grains can maintain excellent toughness and heat conductivity. The average grain size of the second binder grains is preferably more than or equal to 0.25 μm and less than or equal to 0.7 μm, and is more preferably more than or equal to 0.3 μm and less than or equal to 0.6 μm.

In the present specification, the average grain size of the second binder grains refers to the average value of the equivalent circle diameters of the crystal grains of 10 or more arbitrarily selected second binder grains.

In the measurements performed by the Applicant, as long as the measurements were performed in the same sample, measurement results were not substantially varied even when measurement visual fields to be selected in the cubic boron nitride sintered material were changed and calculation was performed multiple times. It was confirmed that the measurement results are not intentional even when the measurement visual fields are set arbitrarily.

A method of measuring the equivalent circle diameter of each of the crystal grains of the second binder grains will be described in (2-1) and (2-2) below.

(2-1) A sample is obtained from the cBN sintered material, and is sliced to have a thickness of 30 to 100 nm using an argon ion slicer (provided by JEOL), thereby producing a cut piece. The cut piece is observed using a transmission electron microscope (hereinafter, also referred to as "TEM") (JEM-2100F/Cs (trade name) provided by JEOL) at a magnification of 20,000×, thereby obtaining a third image. In the third image, the cBN grains are observed as black, and the interface between the binder phase and each grain is observed as white or gray. The size of the observation visual field is 3.5 μm×3.5 μm, and the area ratio of the cBN grains (black) in the observation visual field is less than or equal to 30%.

(2-2) Next, binarization processing is performed onto the third image using image analysis software ("WinROOF" provided by Mitani Corporation). The image analysis software is used to calculate the equivalent circle diameter of each of the crystal grains from the image having been through the binarization processing. On this occasion, crystal grains each having an equivalent circle diameter of less than 20 nm are eliminated as noise in the measurement.

A specific method of the binarization processing will be described with reference to FIGS. 7 to 9.

Figure 7:
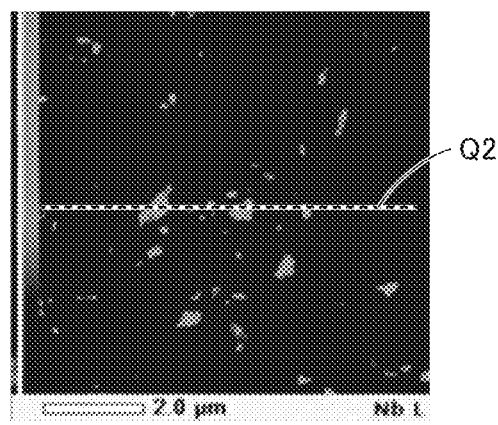
FIG. 7 shows an image obtained by loading, into image processing software, an element mapping image obtained by observing the cBN sintered material according to the present disclosure using a TEM-EDX.
Figure 8:
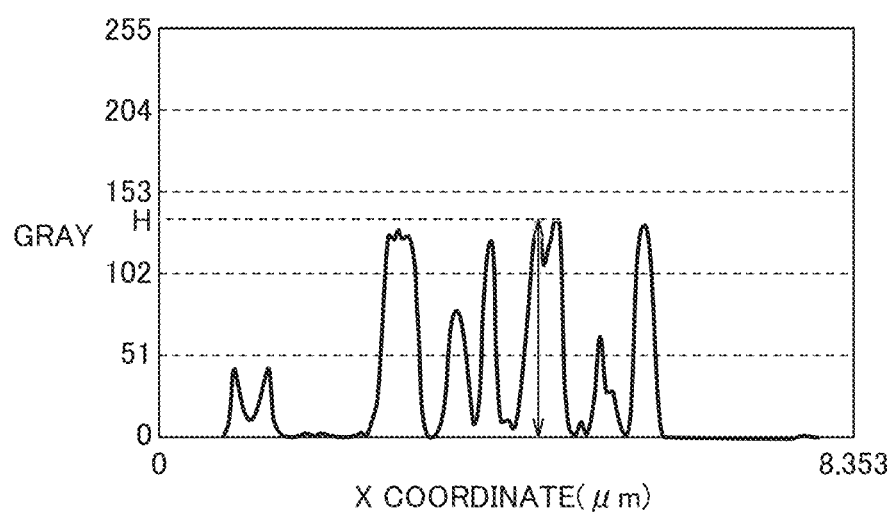
FIG. 8 is a concentration cross section graph obtained from the image of FIG. 7.

FIG. 7 shows an image obtained by loading, into the image processing software, the element mapping image obtained by observing the cBN sintered material using the TEM-EDX. As shown in FIG. 7, an arbitrary line Q2 is drawn in the loaded image.

Measurement is performed along line Q2 in a cross sectional view for concentration, and a GRAY value is read. A graph (hereinafter, also referred to as "concentration cross section graph") is prepared with the X coordinate representing line Q2 and the Y coordinate representing the GRAY value. FIG. 8 shows the concentration cross section graph of the image of FIG. 7.

First, in the element mapping image of FIG. 7, 10 or more points in the region having first metal element M existing therein are subjected to element analysis so as to find the atomic % of each of Ti, M, C, and N, conversion is performed such that an amount of Ti+an amount of M becomes 100%, and the average value of values of M that are more than or equal to 10 atomic % is defined as α. This is the average value of M of the second binder grains. Further, the average value of values of M that are less than 10 atomic % is defined as β. This value is the average value of M of the first binder grains. An intermediate value between α and β is defined as γ. That is, $\gamma=(\alpha+\beta)/2$. In FIG. 8, values that are more than equal to a value obtained by multiplying maximum value H of the GRAY value by γ/α are defined as the second binder grains, and the binarization processing is performed with the X coordinate and the Y coordinate of a boundary therebetween being used as threshold values. An image having been through the binarization is shown in FIG. 9, and shows the second binder grains.

Figure 9:
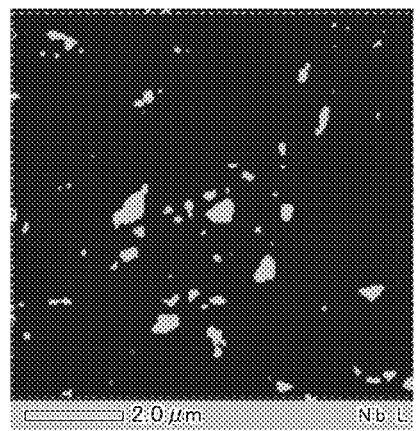
FIG. 9 shows an image obtained by performing binarization processing onto the image of FIG. 7.

In FIG. 9, the equivalent circle diameter of each of the bright fields (originated from the second binder grains) is calculated. The calculated value corresponds to the equivalent circle diameter of each of the crystal grains of the second binder grains.

In the cubic boron nitride sintered material according to the present disclosure, the ratio of the mass of the first binder grains to the total mass of the first binder grains and the second binder grains is preferably more than or equal to 10% and less than or equal to 95%. Thus, crystal grains having different lattice constants are adjacent to each other, which leads to misaligned grain boundaries to improve the strength due to effects of lattice defects and stress, thereby improving the breakage resistance. The ratio of the mass of the first binder grains to the total of the masses of the first binder grains and the second binder grains is more preferably more than or equal to 30% and less than or equal to 90%, and is further preferably more than or equal to 50% and less than or equal to 80%.

The ratio of the mass of the first binder grains to the total mass of the first binder grains and the second binder grains can be measured by an X-ray diffraction method. A specific measurement method will be described in (3-1) to (3-3) below.

(3-1) The cubic boron nitride sintered material is processed using a surface polishing device and is then mirror-polished by a mirror-polishing device, and the mirror-polished surface is regarded as an observation surface.

(3-2) An X-ray diffraction device ("MiniFlex600" (trade name) provided by Rigaku) is used to obtain an X-ray diffraction spectrum of the cut surface of the cubic boron nitride sintered material. Conditions for the X-ray diffraction device on this occasion are as follows.

Characteristic X-ray: Cu-Kα (wavelength of 1.54 Å)
Tube voltage: 40 kV
Tube current: 15 mA
Filter: multilayer mirror
Optical system: concentration method
X-ray diffraction method: θ-2θ method
Scanning speed: 2θ=4°/min
Measurement range: 10 to 100°

(3-3) In the obtained X-ray diffraction spectrum, the following peak intensities A and B are measured.

Peak intensity A: When the obtained X-ray diffraction spectrum data is read using the analysis software ("PDXL2" (trade name) provided by Rigaku), background is automatically calculated, and a value obtained by subtracting the background therefrom is presented at an item for the height of the peak information of the (220) plane of the first binder grain. This value is peak intensity A.

Peak intensity B: When the obtained X-ray diffraction spectrum data is read using the analysis software, PDXL2, background is automatically calculated, and a value obtained by subtracting the background therefrom is presented at an item for the height of the peak information of the (220) plane of the second binder grain. This value is peak intensity B.

The ratio of the mass of the first binder grains to the total mass of the first binder grains and the second binder grains is obtained by calculating a value obtained by: peak intensity A/(peak intensity A+peak intensity B).

Figure 10:
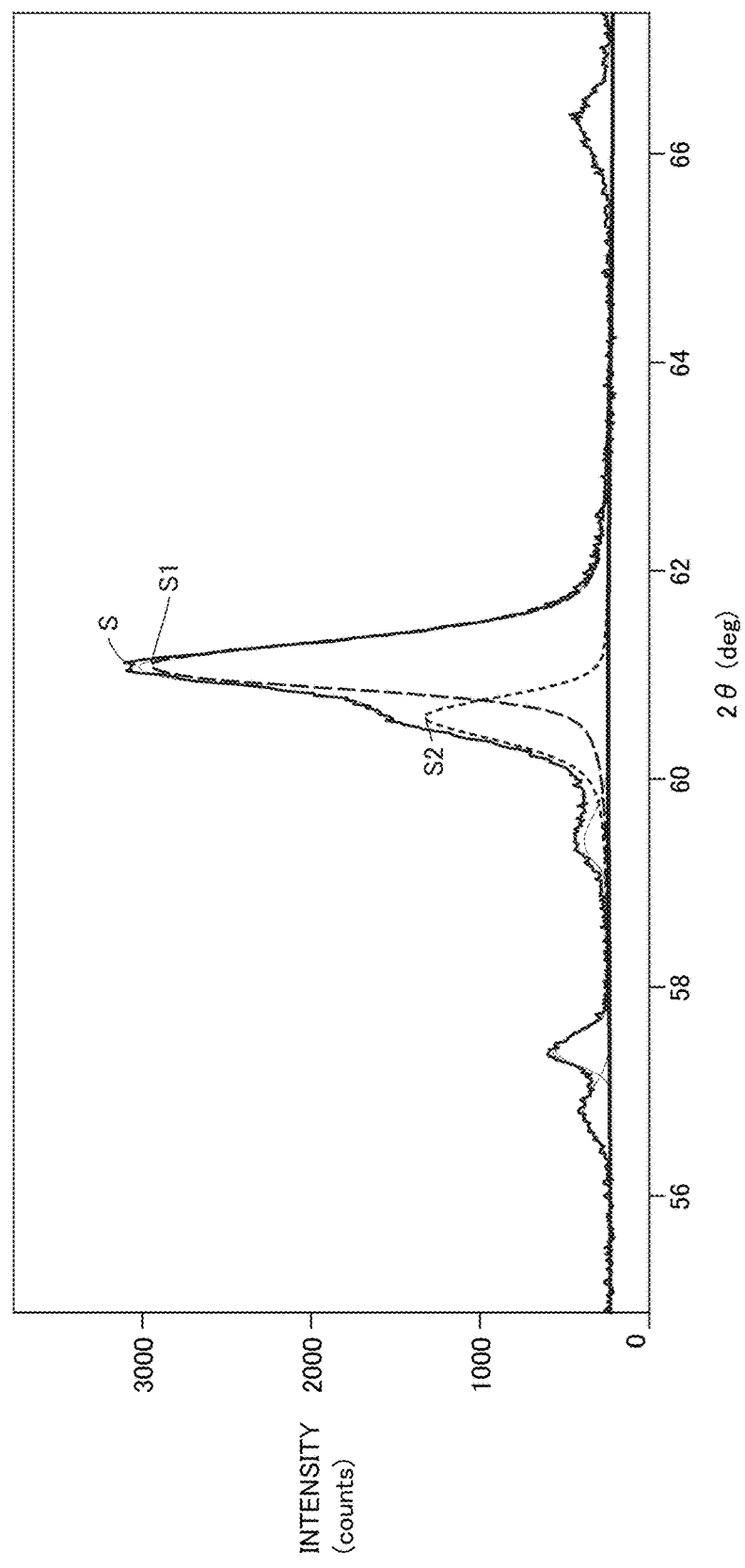
FIG. 10 shows an exemplary X-ray spectrum of the cubic boron nitride sintered material according to the present disclosure.

FIG. 10 shows an exemplary X-ray diffraction spectrum obtained in (3-2). As shown in FIG. 10, part of the peak (S1) of the first binder grains and part of the peak (S2) of the second binder grains may overlap with each other, with the result that a shoulder may be observed on the high angle side or low angle side of one peak (S). In this case, analysis is performed with the one peak being recognized as two peaks in the analysis software ("PDXL2" (trade name) provided by Rigaku). When the analysis software does not automatically recognize the two peaks, the shoulder on the low angle side or high angle side (low angle side in FIG. 10) of the one peak is regarded as the peak of the second binder grains, the peak is added using a peak addition function, and fitting is performed.

Since the first binder grains and the second binder grains have the same degree of electron density, the above-described X-ray peak intensity ratio can be regarded as the mass ratio in the cubic boron nitride sintered material.

Second Embodiment: Method of Producing Cubic Boron Nitride Sintered Material

A method of producing the cBN sintered material according to the present disclosure will be described. The method of producing the cBN sintered material according to the present disclosure can include: a step (hereinafter, also referred to as "preparation step") of preparing a cubic boron nitride powder (hereinafter, also referred to as "cBN powder"), a first binder powder and a second binder powder; a step (hereinafter, also referred to as "formulation step") of formulating a powder mixture by mixing the cBN powder and the binder powder; and a step (hereinafter, also referred to as "sintering step") of obtaining the cubic boron nitride sintered material by sintering the powder mixture. Hereinafter, each step will be described in detail.

<Preparation Step>

First, the cBN powder and the binder powder are prepared. The cBN powder is a source material powder for the cBN grains included in the cBN sintered material. The cBN powder is not particularly limited and known cBN powder can be used. The binder powder is a source material powder for the binder phase included in the cBN sintered material.

A compound included in the binder phase of the cBN sintered material according to the present disclosure is formed by dissolving, in a solid state, the first metal element having an atomic radius different from that of titanium (Ti) in TiC$_x$N$_y$ (x≥0, y≥0, and x+y>0), and has a composition of TiM2C$_x$N$_y$ (x≥0, y≥0, x+y>0, M2 represents one or more kinds of first metal elements, and the ratio of the number of atoms of M2 to the total of the number of atoms of Ti and the number of atoms of M2 is more than or equal to 10% and less than or equal to 80%). Hereinafter, the binder having the composition of TiM2C$_x$N$_y$ will be referred to as "main binder".

With a conventional general method, it is difficult to dissolve a metal element having a different atomic radius in titanium in a solid state. As a result of diligent study, the present inventors have found that a main binder powder in which a metal element having a different atomic radius is dissolved in titanium in a solid state can be produced by performing heat treatment (hereinafter, also referred to as "high-temperature heat treatment") onto the source material for the main binder at a high temperature of more than or equal to 1800° C. Further, it has been found that such a main binder powder in which a metal element having a different atomic radius is dissolved in titanium in a solid state can also be produced by performing powder thermal plasma treatment onto an element powder included in the main binder. Details of the high-temperature heat treatment and the powder thermal plasma treatment will be described as follows.

(Method Using High-Temperature Heat Treatment)

The following describes an exemplary method of producing the main binder powder by using the high-temperature heat treatment.

A main binder powder mixture is obtained by mixing: a TiO$_2$ powder; an oxide powder of at least one element selected from a group consisting of zirconium, hafnium, a group 5 element, a group 6 element in the periodic table, and aluminum; and a carbon (C) powder.

Examples of the oxide powder of the first metal element include zirconium oxide (ZrO$_2$), hafnium oxide (HfO$_2$), vanadium oxide (V$_2$O$_5$), niobium oxide (Nb$_2$O$_5$), tantalum oxide (Ta$_2$O$_5$), chromium oxide (Cr$_2$O$_3$), molybdenum oxide (MoO$_3$), and tungsten oxide (WO$_3$).

The TiO$_2$ powder, the oxide powder of the first metal element, and the carbon powder are preferably blended at the following mixing ratio in atomic %:titanium:the first metal element:the carbon content=0.9 to 0.2:0.1 to 0.8:0.1 to 0.9.

The obtained main binder powder mixture is subjected to heat treatment at 1800° C. to 2200° C. for 60 minutes under a nitrogen atmosphere. Thus, a single-phase compound having a composition of TiM2C$_x$N$_y$ is synthesized. The single-phase compound is pulverized to attain a desired grain size in accordance with a wet pulverization method, thereby obtaining a main binder powder having a composition of TiM2C$_x$N$_y$.

(Method Using Powder Thermal Plasma Treatment)

The following describes an exemplary method of producing the main binder powder by using the powder thermal plasma treatment.

A main binder powder mixture is obtained by mixing a titanium (Ti) powder, an M (first metal element) powder, and a carbon (C) powder. The mixing ratio of the titanium (Ti) powder, the M (first metal element) powder, and the carbon (C) powder can be as follows in weight ratio: the titanium (Ti) powder:the M (first metal element) powder:the carbon (C) powder=20 to 80:10 to 80:1 to 20.

The obtained main binder powder mixture is subjected to treatment using a thermal powder plasma device (TP-40020NPS provided by JEOL). For example, the main binder powder mixture is set in a chamber of the thermal powder plasma device so as to perform treatment thereto by introducing N$_2$ gas at a flow rate of 30 L/min under a condition of an output of 6 kW. Thus, the main binder powder having a composition of TiM2C$_x$N$_y$ can be obtained.

In order to sinter the cBN powder and the main binder powder, Ti$_2$AlN and/or Ti$_2$AlC are preferably used as a sub-binder. The use of the sub-binder promotes binding of the cBN grains and the main binder. Further, by mixing the main binder powder and the sub-binder powder and sintering them, a compound having a composition of TiM1C$_x$N$_y$ (x≥0, y≥0, x+y>0, M1 represents the same first metal element as M2, and the ratio of the number of atoms of M1 to the total of the number of atoms of Ti and the number of atoms of M1 is more than or equal to 0.01% and less than 10%) is generated from part of the first metal element (M2) included in the main binder powder and the sub-binder powder. The compound having the composition of TiM1C$_x$N$_y$ constitutes the first binder grains in the cBN sintered material.

The following describes an exemplary method of producing a Ti$_2$AlC powder as the sub-binder powder. A sub-binder powder mixture is obtained by mixing a titanium (Ti) powder, an aluminum (Al) powder, and a TiC powder at the following weight ratio: the titanium (Ti) powder:the aluminum (Al) powder:the TiC powder=37:22:41.

The obtained sub-binder powder mixture is subjected to heat treatment at 1500° C. for 60 minutes under an argon atmosphere. Thus, a single-phase compound having a composition of Ti$_2$AlC is synthesized. The single-phase compound is pulverized to attain a desired grain size in accordance with a wet pulverization method, thereby obtaining a sub-binder powder having a composition of Ti$_2$AlC.

<Formulation Step>

This step is a step of formulating a powder mixture by mixing the cBN powder and the binder powder. Here, the binder powder can include the main binder powder and the sub-binder powder.

The mixing ratio of the cBN powder and the binder powder is adjusted such that the ratio of the cBN powder in the powder mixture becomes more than or equal to 20 volume % and less than or equal to 80 volume % and the ratio of the binder powder becomes more than or equal to 20 volume % and less than or equal to 80 volume %. Regarding the mixing ratio of the main binder powder and the sub-binder powder, when the main binder powder and the sub-binder powder are used as the binder powder, it is assumed that the sub-binder is decomposed into $TiM1C_xN_y$ and Al after the sintering, and calculation is performed to blend them at the following weight ratio: $TiM1C_xN_y$:$TiM2C_xN_y$=10 to 95:90 to 5.

It should be noted that the mixing ratio of the cBN powder and the binder powder in the powder mixture is substantially the same as the ratio of the cBN grains and the binder phase in the cBN sintered material obtained by sintering the powder mixture. Therefore, by adjusting the mixing ratio of the cBN powder and the binder powder in the powder mixture, the ratio of the cBN grains and the binder phase in the cBN sintered material can be adjusted to fall within a desired range.

The method of mixing the cBN powder and the binder powder is not particularly limited; however, in order to efficiently and uniformly mix the powders, ball mill mixing, bead mill mixing, planetary mill mixing, jet mill mixing, or the like can be used. Each of the mixing methods may be performed in a wet manner or dry manner.

The cBN powder and the binder powder are preferably mixed by wet ball mill mixing employing ethanol, acetone or the like as a solvent. After the mixing, the solvent is removed by natural drying. Thereafter, an impurity such as moisture adsorbed on the surfaces is volatilized by heat treatment to clean the surfaces. Thus, the powder mixture is formulated.

<Sintering Step>

This step is a step of obtaining the cBN sintered material by sintering the powder mixture. In this step, the powder mixture is sintered under a high-temperature and high-pressure condition, thereby producing the cBN sintered material.

First, in order to remove moisture and impurity in the powder mixture, high-temperature (for example, more than or equal to 900° C.) heat treatment (hereinafter, also referred to as "degassing treatment") is performed in vacuum. The powder mixture having been through the degassing treatment is provided in a capsule for ultra-high pressure sintering, and is vacuum-sealed by using a metal as a sealing material in vacuum.

Next, the vacuum-sealed powder mixture is sintered using an ultra-high temperature and high-pressure device. Sintering conditions are preferably 5.5 to 8 GPa, more than or equal to 1200° C. and less than 1800° C., and 5 to 60 minutes, for example. In particular, in view of balance between cost and sinterability, 6 to 7 GPa, 1400 to 1600° C., and 10 to 30 minutes are preferable. Thus, the cBN sintered material is produced.

Third Embodiment: Tool

The cubic boron nitride sintered material according to the present disclosure can be used as a tool material. The tool can include the cBN sintered material as a substrate. Further, the tool may have a coating film on a surface of the cBN sintered material serving as the substrate.

The shape and purpose of use of the tool are not limited particularly. Examples of the tool include a drill, an end mill, an indexable cutting insert for drill, an indexable cutting insert for end mill, an indexable cutting insert for milling, an indexable cutting insert for turning, a metal saw, a gear cutting tool, a reamer, a tap, an insert for crankshaft pin milling, and the like.

Further, the tool according to the present embodiment is not limited only to a tool entirely composed of the cBN sintered material, and includes a tool having a portion (particularly, a cutting edge portion or the like) composed of the cBN sintered material. For example, the tool according to the present embodiment also includes a tool in which a base body (supporting body) composed of a cemented carbide or the like has a cutting edge portion composed of the cBN sintered material. In this case, the cutting edge portion is literally regarded as a tool. In other words, even when the cBN sintered material constitutes only a portion of the tool, the cBN sintered material is referred to as a tool.

Since the tool according to the present embodiment includes the above-described cBN sintered material, a long life of the tool can be attained.

Examples

The following describes the present embodiment more specifically by way of examples. However, the present embodiment is not limited by these examples.

<Specimen 1>

(Preparation Step)

A cBN powder (average particle size: 3 μm), a main binder powder (TiNbCN powder), and a sub-binder powder ($Ti_2AlC$ powder) were prepared. As the cBN powder, a commercially available cBN powder was prepared.

The main binder powder (TiNbCN powder) was produced by the method using the high-temperature heat treatment. Specifically, a main binder powder mixture was obtained by mixing a $TiO_2$ powder, a $Nb_2O_5$ powder, and a carbon (C) powder at a weight ratio of 57.19:16.79:26.02. The main binder powder mixture was subjected to heat treatment at 2250° C. for 60 minutes under a nitrogen atmosphere, thereby synthesizing a single-phase compound having a composition of TiNbCN.

The single-phase compound was pulverized using a bead mill ("LABSTAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiNbCN powder having an average particle size of 0.5 μm.

The TiNbCN powder (main binder powder) and a $Ti_2AlC$ powder (sub-binder powder) were mixed to prepare a binder powder. The mixing ratio of the TiNbCN powder (main binder powder) and the $Ti_2AlC$ powder (sub-binder powder) was adjusted such that the ratio of the first binder grains and the second binder grains in the sintered material became 70:30 in weight.

(Formulation Step)

The cBN powder and the binder powder were mixed at the following volume ratio: the cBN powder:the binder powder=67:33. The cBN powder and the binder powder were mixed uniformly using a ball mill, thereby obtaining a powder mixture.

(Sintering Step)

The obtained powder mixture was provided in a Ta container with the powder mixture being in contact with a WC-6% Co cemented carbide disc, was vacuum-sealed, and was sintered at 6.5 GPa and 1500° C. for 15 minutes using a belt-type ultra-high pressure and high temperature generation device. Thus, a cBN sintered material was produced.

<Specimen 2>

A cBN sintered material was produced in the same manner as in Specimen 1 except that the pulverization was performed such that the TiNbCN powder (main binder powder) had an average particle size of 0.23 µm (pulverization time: 2.2 hours) in the preparation step.

<Specimen 3>

A cBN sintered material was produced in the same manner as in Specimen 1 except that the pulverization was performed such that the TiNbCN powder (main binder powder) had an average particle size of 0.1 µm (pulverization time: 3.0 hours) in the preparation step.

<Specimen 4>

A cBN sintered material was produced in the same manner as in Specimen 1 except that a $TiO_2$ powder, a $Nb_2O_5$ powder, and a carbon (C) powder were mixed at a weight ratio of 70.49:2.39:27.12 in the preparation step.

<Specimens 5 to 9>

Each of cBN sintered materials was produced in the same manner as in Specimen 1 except that in the preparation step, the mixing ratio of the TiNbCN powder (main binder powder) and the $Ti_2AlC$ powder (sub-binder powder) was adjusted such that the ratio of the first binder grains and the second binder grains in the sintered material became 51:49 in the case of Specimen 5, 92:8 in the case of Specimen 6, 25:75 in the case of Specimen 7, 96:4 in the case of Specimen 8, and 5:95 in the case of Specimen 9 in weight.

<Specimen 10>

A cBN sintered material was produced in the same manner as in Specimen 1 except that a TiZrCN powder was used as the main binder powder instead of the TiNbCN powder.

The TiZrCN powder was produced by the following method. A $TiO_2$ powder, a $ZrO_2$ powder, and a carbon (C) powder were mixed at a weight ratio of 58.35:15.88:25.77, thereby obtaining a main binder powder mixture. The main binder powder mixture was subjected to heat treatment at 2250° C. for 60 minutes under a nitrogen atmosphere, thereby synthesizing a single-phase compound having a composition of TiZrCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiZrCN powder having an average particle size of 0.5 µm.

<Specimen 11>

A cBN sintered material was produced in the same manner as in Specimen 1 except that a TiMoCN powder was used as the main binder powder instead of the TiNbCN powder.

The TiMoCN powder was produced by the following method. A $TiO_2$ powder, a $MoO_3$ powder, and a carbon (C) powder were mixed at a weight ratio of 55.99:17.80:26.21, thereby obtaining a main binder powder mixture. The main binder powder mixture was subjected to heat treatment at 2250° C. for 60 minutes under a nitrogen atmosphere, thereby synthesizing a single-phase compound having a composition of TiMoCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiMoCN powder having an average particle size of 0.5 µm.

<Specimen 12>

A cBN sintered material was produced in the same manner as in Specimen 1 except that a TiHfCN powder was used as the main binder powder instead of the TiNbCN powder.

The TiHfCN powder was produced by the following method. A $TiO_2$ powder, a $HfO_2$ powder, and a carbon (C) powder were mixed at a weight ratio of 52.45:24.38:23.17, thereby obtaining a main binder powder mixture. The main binder powder mixture was subjected to heat treatment at 2250° C. for 60 minutes under a nitrogen atmosphere, thereby synthesizing a single-phase compound having a composition of TiHfCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiHfCN powder having an average particle size of 0.5 µm.

<Specimen 13>

A cBN sintered material was produced in the same manner as in Specimen 1 except that a TiTaCN powder was used as the main binder powder instead of the TiNbCN powder.

The TiTaCN powder was produced by the following method. A $TiO_2$ powder, a $Ta_2O_5$ powder, and a carbon (C) powder were mixed at a weight ratio of 51.47:25.11:23.42, thereby obtaining a main binder powder mixture. The main binder powder mixture was subjected to heat treatment at 2250° C. for 60 minutes under a nitrogen atmosphere, thereby synthesizing a single-phase compound having a composition of TiTaCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiTaCN powder having an average particle size of 0.5 µm.

<Specimen 14>

A cBN sintered material was produced in the same manner as in Specimen 1 except that a TiWCN powder was used as the main binder powder instead of the TiNbCN powder.

The TiWCN powder was produced by the following method. A $TiO_2$ powder, a $WO_3$ powder, and a carbon (C) powder were mixed at a weight ratio of 51.53:26.39:22.08, thereby obtaining a main binder powder mixture. The main binder powder mixture was subjected to heat treatment at 2250° C. for 60 minutes under a nitrogen atmosphere, thereby synthesizing a single-phase compound having a composition of TiWCN.

The single-phase compound was pulverized using a bead mill ("LABSTAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiWCN powder having an average particle size of 0.5 μm.

<Specimen 15>

A cBN sintered material was produced in the same manner as in Specimen 1 except that a TiCrCN powder was used as the main binder powder instead of the TiNbCN powder.

The TiCrCN powder was produced by the following method. A $TiO_2$ powder, a $Cr_2O_3$ powder, and a carbon (C) powder were mixed at a weight ratio of 62.64:10.52:26.84, thereby obtaining a main binder powder mixture. The main binder powder mixture was subjected to heat treatment at 2250° C. for 60 minutes under a nitrogen atmosphere, thereby synthesizing a single-phase compound having a composition of TiCrCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiCrCN powder having an average particle size of 0.5 μm.

<Specimen 16>

A cBN sintered material was produced in the same manner as in Specimen 1 except that a TiVCN powder was used as the main binder powder instead of the TiNbCN powder.

The TiVCN powder was produced by the following method. A $TiO_2$ powder, a $V_2O_5$ powder, and a carbon (C) powder were mixed at a weight ratio of 60.39:12.13:27.48, thereby obtaining a main binder powder mixture. The main binder powder mixture was subjected to heat treatment at 2250° C. for 60 minutes under a nitrogen atmosphere, thereby synthesizing a single-phase compound having a composition of TiVCN.

The single-phase compound was pulverized using a bead mill ("LAB STAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 1.5 hours, thereby obtaining a TiVCN powder having an average particle size of 0.5 μm.

<Specimens 17 to 22>

Each of cBN sintered materials was produced in the same manner as in Specimen 1 except that in the preparation step, the mixing ratio of the cBN powder and the binder powder was 74:26 in the case of Specimen 17, 40:60 in the case of Specimen 18, 78:22 in the case of Specimen 19, 22:78 in the case of Specimen 20, 85:15 in the case of Specimen 21, and 15:85 in the case of Specimen 22 in volume ratio.

<Specimen 23>

(Preparation Step)

A cBN powder (average particle size: 3 μm), a main binder powder, and a sub-binder powder were prepared. The main binder powder was produced by the method using the high-temperature heat treatment. Specifically, a $TiO_2$ powder, a $Cr_2O_3$ powder, and a carbon (C) powder were mixed at a weight ratio of 62.64:10.52:26.84, thereby obtaining a main binder powder mixture. The main binder powder mixture was subjected to heat treatment at 2250° C. for 60 minutes under a nitrogen atmosphere, thereby synthesizing a single-phase compound having a composition of TiCrCN.

The single-phase compound was pulverized using a bead mill ("LABSTAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 2 hours, thereby obtaining a TiCrCN powder having an average particle size of 0.25 μm.

The TiCrCN powder (main binder powder) and a $Ti_2AlC$ powder (sub-binder powder) were mixed to prepare a binder powder. The mixing ratio of the TiCrCN powder (main binder powder) and the $Ti_2AlC$ powder (sub-binder powder) was adjusted such that the ratio of the first binder grains and the second binder grains in the sintered material became 96:4 in weight.

(Formulation Step)

The cBN powder and the binder powder were mixed at the following volume ratio: the cBN powder:the binder powder=78:22. The cBN powder and the binder powder were mixed uniformly using a ball mill, thereby obtaining a powder mixture.

(Sintering Step)

The obtained powder mixture was provided in a Ta container with the powder mixture being in contact with a WC-6% Co cemented carbide disc, was vacuum-sealed, and was sintered at 6.5 GPa and 1500° C. for 15 minutes using a belt-type ultra-high pressure and high temperature generation device. Thus, a cBN sintered material was produced.

<Specimen 24>

A cBN sintered material was produced in the same manner as in Specimen 23 except that the pulverization was performed such that the TiCrCN powder (main binder powder) had an average particle size of 0.5 μm (pulverization time: 1.5 hours) in the preparation step.

<Specimens 25 and 26>

Each of cBN sintered materials was produced in the same manner as in Specimen 23 except that in the preparation step, the mixing ratio of the TiCrCN powder (main binder powder) and the $Ti_2AlC$ powder (sub-binder powder) was adjusted such that the ratio of the first binder grains and the second binder grains in the sintered material was 92:8 in the case of Specimen 25 and 70:30 in the case of Specimen 26 in weight.

<Specimen 27>

A cBN sintered material was produced in the same manner as Specimen 26 except that a TiHfCN powder was used as the main binder powder instead of the TiCrCN powder. The TiHfCN powder was produced in the same manner as Specimen 12.

<Specimen 28>

(Preparation Step)

A cBN powder (average particle size: 3 μm), a main binder powder, and a sub-binder powder were prepared. The main binder powder was produced by the method using the high-temperature heat treatment. Specifically, a $TiO_2$ powder, a $Nb_2O_5$ powder, and a carbon (C) powder were mixed at a weight ratio of 57.19:16.79:26.02, thereby obtaining a main binder powder mixture. The main binder powder mixture was subjected to heat treatment at 2250° C. for 60 minutes under a nitrogen atmosphere, thereby synthesizing a single-phase compound having a composition of TiNbCN.

The single-phase compound was pulverized using a bead mill ("LABSTAR Mini" (trade name) provided by Ashizawa Finetech). Specifically, the single-phase compound and $ZrO_2$ beads were introduced into an ethanol solvent to form a slurry having a slurry concentration of 20%. The slurry was introduced into the bead mill and pulverization was performed for 2.5 hours, thereby obtaining a TiNbCN powder having an average particle size of 0.2 µm.

The TiNbCN powder (main binder powder) and an Al powder (Minalco 900F (trade name) provided by Minalco) were mixed to prepare a binder powder. The mixing ratio of the TiNbCN powder (main binder powder) and the Al powder was adjusted such that the ratio of aluminum (Al) in the binder powder became 5 weight %.

(Formulation Step)

The cBN powder and the binder powder were mixed at the following volume ratio: the cBN powder:the binder powder=67:33. The cBN powder and the binder powder were mixed uniformly using a ball mill, thereby obtaining a powder mixture.

(Sintering Step)

The obtained powder mixture was provided in a Ta container with the powder mixture being in contact with a WC-6% Co cemented carbide disc, was vacuum-sealed, and was sintered at 6.5 GPa and 1500° C. for 15 minutes using a belt-type ultra-high pressure and high temperature generation device. Thus, a cBN sintered material was produced.

<Specimen 29>

A cBN sintered material was produced in the same manner as in Specimen 1 using the same binder as that in Specimen 1 except that the sintering temperature was set to 1300° C.

<Specimen 30>

A cBN sintered material was produced in the same manner as in Specimen 1 using the same binder as that in Specimen 1 except that the sintering temperature was set to 1800° C.

<Specimen 31>

A cBN sintered material was produced in the same manner as in Specimen 1 except that a $TiO_2$ powder, a $Nb_2O_5$ powder, and a carbon (C) powder were mixed at a weight ratio of 62.10:11.48:26.42 in the preparation step.

<Specimen 32>

A cBN sintered material was produced in the same manner as in Specimen 1 except that a $TiO_2$ powder, a $Nb_2O_5$ powder, and a carbon (C) powder were mixed at a weight ratio of 10.17:67.68:22.15 in the preparation step.

<Specimen 33>

A cBN sintered material was produced in the same manner as in Specimen 1 to have the same composition as that in Specimen 1 except that the pulverization was performed such that the TiNbCN powder (main binder powder) had an average particle size of 1.0 µm (pulverization time: 1 hour).

<Specimen 34>

A cBN sintered material was produced in the same manner as in Specimen 1 to have the same composition as that in Specimen 1 except that the pulverization was performed such that the TiNbCN powder (main binder powder) had an average particle size of 2.0 µm (pulverization time: 0.5 hour).

<Specimen 35>

A cBN sintered material was produced in the same manner as in Specimen 1 to have the same composition as that in Specimen 1 except that the pulverization was performed such that the TiNbCN powder (main binder powder) had an average particle size of 0.8 µm (pulverization time: 1.2 hours).

<Specimen 36>

A cBN sintered material was produced in the same manner as in Specimen 1 except that a TiAlCN powder (main binder powder) was used as the main binder powder instead of the TiNbCN powder.

The TiAlCN powder was produced by the following method. A $TiO_2$ powder, an $Al_2O_3$ powder, and a carbon (C) powder were mixed at a weight ratio of 64.89:7.31:27.80, thereby obtaining a main binder powder mixture. The main binder powder mixture was subjected to heat treatment at 2250° C. for 60 minutes under a nitrogen atmosphere, thereby synthesizing a single-phase compound having a composition of TiAlCN.

[Evaluation]

<<Content Ratios of cBN Grains and Binder Phase>>

In each of the cBN sintered materials of Specimens 1 to 36, the content ratio (volume %) of the cBN grains and the content ratio (volume %) of the binder phase were measured using an energy dispersive X-ray analysis device (EDX) accompanied with a scanning electron microscope (SEM). A specific measurement method has been described in the first embodiment, and therefore will not be described repeatedly. Results are shown in the columns "cBN Grains (volume %)" and "Binder Phase (volume %)" of the "Cubic Boron Nitride Sintered Material" in Tables 1-2, 2-2 and 3-2.

As a result of the measurement, in each of all the Specimens, it was confirmed that the content ratio of the cBN grains and the content ratio of the binder phase in the cBN sintered material were maintained to be the same as the content ratio of the cBN powder and the content ratio of the binder powder in the total (volume %) (i.e., powder mixture) of the cBN powder and the binder powder.

<<Compositions of First Binder Grains and Second Binder Grains and Ratio of First Metal Element>>

For each of the cBN sintered materials of Specimens 1 to 36, the compositions of the first binder grains and the second binder grains and the contents (based on the number of atoms) of the constituent elements in the first binder grains and the second binder grains were measured using a TEM-EDX. A specific measurement method has been described in the first embodiment, and therefore will not be described repeatedly.

As a result of the measurement, in each of the Specimens, the first binder grains, the second binder grains, $TiB_2$, AlN and $Al_2O_3$ were confirmed. Specific binder compositions of the first binder grains and the second binder grains in each Specimen are respectively shown in the column "Composition" of "First Binder Grains" and the column "Composition" of "Second Binder Grains" in Tables 1-2, 2-2 and 3-2.

Further, in each of the first binder grains and the second binder grains, the ratio of the number of atoms of the first metal element (hereinafter, the ratio of the number of atoms of the first metal element in the first binder grain is also referred to as "M1 ratio", and the ratio of the number of atoms of the first metal element in the second binder grain is also referred to as "M2 ratio") to the total of the number of atoms of titanium and the number of atoms of the first metal element were calculated. Results are shown in the column "M1 Ratio (%)" of "First Binder Grains" as well as the column "M2 Ratio (%)" of "Second Binder Grains" in Tables 1-2, 2-2 and 3-2.

<<Average Grain Size of Second Binder Grains>>

In each of the cBN sintered materials of Specimens 1 to 36, the average grain size of the second binder grains was measured. A specific measurement method has been described in the first embodiment, and therefore will not be described repeatedly. Results are shown in the column "Average Grain Size of Second Binder Grains" in Tables 1-2, 2-2 and 3-2.

<<Cutting Test>>

Cutting tools (tool model number: DNGA150412; cutting edge process: S01225) were produced in which the cBN sintered materials of Specimens 1 to 36 were used as cutting edges. A cutting test was performed using each of the cutting tools under the following cutting conditions.

Cutting speed: 200 m/min.
Feeding speed: 0.2 mm/rev.
Depth of cut: 0.25 mm
Coolant: DRY
Cutting method: intermittent cutting
Lathe: LB400 (provided by OKUMA Corporation)
Workpiece: hardened steel (SCr415 carburized hardened steel; hardness of 60 HRC; intermittent cutting due to V grooves provided at an outer peripheral portion thereof)

The cutting conditions described above correspond to high-efficiency processing of a high-strength hardened steel.

The cutting edge was observed per cutting distance of 0.1 km to measure a size of chipping of the cutting edge. The size of chipping of the cutting edge was defined as the size of breakage in a principal force direction with respect to the position of the ridgeline of the cutting edge before the cutting. The cutting distance at a point of time at which the size of chipping of the cutting edge was more than or equal to 0.1 mm was measured. It should be noted that a longer cutting distance means a longer life of the cutting tool. Results are shown in the column "Distance (km)" in Tables 1-2, 2-2 and 3-2.

TABLE 1-1

| Specimen No. | cBN Powder (volume %) | Binder Powder (volume %) | Binder Powder Main Binder Powder Mixing Ratio of Source Material Powders (weight %) | Sub-Binder Powder | Pulverization Time (hour) |
|---|---|---|---|---|---|
| 1 | 67 | 33 | TiNbCN, (TiO$_2$: Nb$_2$O$_5$: C = 57.19:16.79:26.02) | Ti$_2$AlC | 1.5 |
| 2 | 67 | 33 | TiNbCN, (TiO$_2$: Nb$_2$O$_5$: C = 57.19:16.79:26.02) | Ti$_2$AlC | 2.2 |
| 3 | 67 | 33 | TiNbCN, (TiO$_2$: Nb$_2$O$_5$: C = 57.19:16.79:26.02) | Ti$_2$AlC | 3.0 |
| 4 | 67 | 33 | TiNbCN, (TiO$_2$: Nb$_2$O$_5$: C = 70.49:2.39:27.12) | Ti$_2$AlC | 1.5 |
| 5 | 67 | 33 | TiNbCN, (TiO$_2$: Nb$_2$O$_5$: C = 57.19:16.79:26.02) | Ti$_2$AlC | 1.5 |
| 6 | 67 | 33 | TiNbCN, (TiO$_2$: Nb$_2$O$_5$: C = 57.19:16.79:26.02) | Ti$_2$AlC | 1.5 |
| 7 | 67 | 33 | TiNbCN, (TiO$_2$: Nb$_2$O$_5$: C = 57.19:16.79:26.02) | Ti$_2$AlC | 1.5 |
| 8 | 67 | 33 | TiNbCN, (TiO$_2$: Nb$_2$O$_5$: C = 57.19:16.79:26.02) | Ti$_2$AlC | 1.5 |
| 9 | 67 | 33 | TiNbCN, (TiO$_2$: Nb$_2$O$_5$: C = 57.19:16.79:26.02) | Ti$_2$AlC | 1.5 |
| 10 | 67 | 33 | TiZrCN, (TiO$_2$:ZrO$_2$: C = 58.35:15.88:25.77) | Ti$_2$AlC | 1.5 |
| 11 | 67 | 33 | TiMoCN, (TiO$_2$: MoO$_3$: C = 55.99:17.80:26.21) | Ti$_2$AlC | 1.5 |
| 12 | 67 | 33 | TiHfCN, (TiO$_2$: HfO$_2$: C = 52.45:24.38:23.17) | Ti$_2$AlC | 1.5 |
| 13 | 67 | 33 | TiTaCN, (TiO$_2$:Ta$_2$O$_5$: C = 51.47:25.11:23.42) | Ti$_2$AlC | 1.5 |
| 14 | 67 | 33 | TiWCN, (TiO$_2$:WO$_3$: C = 51.53:26.39:22.08) | Ti$_2$AlC | 1.5 |

TABLE 1-2

| Specimen No. | cBN Grains (volume %) | Binder Phase (volume %) | Cubic Boron Nitride Sintered Material | | | | | Average Grain Size of Second Binder Grains (μm) | Mass Ratio of First Binder Grains: | | Evaluation Distance (km) |
|---|---|---|---|---|---|---|---|---|---|---|---|
| | | | First Binder Grains | | Second Binder Grains | | Other Compositions in Binder Phase | | First Binder Grains (%) | Second Binder Grains (Mass Ratio) | |
| | | | Composition | M1 Ratio (%) | Composition | M2 Ratio (%) | | | | | |
| 1 | 67 | 33 | TiNbCN | 5 | TiNbCN | 15 | TiB$_2$, AlN, Al$_2$O$_3$ | 0.5 | 70 | 70:30 | 3.5 |
| 2 | 67 | 33 | TiNbCN | 5 | TiNbCN | 15 | TiB$_2$, AlN, Al$_2$O$_3$ | 0.23 | 70 | 70:30 | 2.9 |
| 3 | 67 | 33 | TiNbCN | 5 | TiNbCN | 15 | TiB$_2$, AlN, Al$_2$O$_3$ | 0.1 | 70 | 70:30 | 1 |
| 4 | 67 | 33 | TiNbCN | 1 | TiNbCN | 2 | TiB$_2$, AlN, Al$_2$O$_3$ | 0.5 | 70 | 70:30 | 0.7 |
| 5 | 67 | 33 | TiNbCN | 5 | TiNbCN | 15 | TiB$_2$, AlN, Al$_2$O$_3$ | 0.5 | 51 | 51:49 | 3.1 |
| 6 | 67 | 33 | TiNbCN | 5 | TiNbCN | 15 | TiB$_2$, AlN, Al$_2$O$_3$ | 0.5 | 92 | 92:8 | 2.8 |
| 7 | 67 | 33 | TiNbCN | 5 | TiNbCN | 15 | TiB$_2$, AlN, Al$_2$O$_3$ | 0.5 | 25 | 25:75 | 2.7 |
| 8 | 67 | 33 | TiNbCN | 5 | TiNbCN | 15 | TiB$_2$, AlN, Al$_2$O$_3$ | 0.5 | 96 | 96:4 | 2.2 |
| 9 | 67 | 33 | TiNbCN | 5 | TiNbCN | 15 | TiB$_2$, AlN, Al$_2$O$_3$ | 0.5 | 5 | 5:95 | 1.9 |
| 10 | 67 | 33 | TiZrCN | 5 | TiZrCN | 15 | TiB$_2$, AlN, Al$_2$O$_3$ | 0.5 | 70 | 70:30 | 3 |
| 11 | 67 | 33 | TiMoCN | 5 | TiMoCN | 15 | TiB$_2$, AlN, Al$_2$O$_3$ | 0.5 | 70 | 70:30 | 2.9 |
| 12 | 67 | 33 | TiHfCN | 5 | TiHfCN | 15 | TiB$_2$, AlN, Al$_2$O$_3$ | 0.5 | 70 | 70:30 | 3.1 |
| 13 | 67 | 33 | TiTaCN | 5 | TiTaCN | 15 | TiB$_2$, AlN, Al$_2$O$_3$ | 0.5 | 70 | 70:30 | 3.2 |
| 14 | 67 | 33 | TiWCN | 5 | TiWCN | 15 | TiB$_2$, AlN, Al$_2$O$_3$ | 0.5 | 70 | 70:30 | 2.85 |

TABLE 2-1

| Specimen No. | cBN Powder (volume %) | Binder Powder (volume %) | Binder Powder Main Binder Powder Mixing Ratio of Source Material Powders (weight %) | Sub-Binder Powder | Pulverization Time (hour) |
|---|---|---|---|---|---|
| 15 | 67 | 33 | TiCrCN, ($TiO_2$: $Cr_2O_3$: C = 57.19:16.79:26.02) | $Ti_2AlC$ | 1.5 |
| 16 | 67 | 33 | TiVCN, ($TiO_2$: $V_2O_5$: C = 57.19:16.79:26.02) | $Ti_2AlC$ | 1.5 |
| 17 | 74 | 26 | TiNbCN, ($TiO_2$: $Nb_2O_5$: C = 57.19:16.79:26.02) | $Ti_2AlC$ | 1.5 |
| 18 | 40 | 60 | TiNbCN, ($TiO_2$: $Nb_2O_5$: C = 70.49:2.39:27.12) | $Ti_2AlC$ | 1.5 |
| 19 | 78 | 22 | TiNbCN, ($TiO_2$: $Nb_2O_5$: C = 57.19:16.79:26.02) | $Ti_2AlC$ | 1.5 |
| 20 | 22 | 78 | TiNbCN, ($TiO_2$: $Nb_2O_5$: C = 57.19:16.79:26.02) | $Ti_2AlC$ | 1.5 |
| 21 | 85 | 15 | TiNbCN, ($TiO_2$: $Nb_2O_5$: C = 57.19:16.79:26.02) | $Ti_2AlC$ | 1.5 |
| 22 | 15 | 85 | TiNbCN, ($TiO_2$: $Nb_2O_5$: C = 57.19:16.79:26.02) | $Ti_2AlC$ | 1.5 |
| 23 | 78 | 22 | TiCrCN, ($TiO_2$: $Cr_2O_3$: C = 57.19:16.79:26.02) | $Ti_2AlC$ | 2 |
| 24 | 78 | 22 | TiCrCN, ($TiO_2$:$Cr_2O_3$: C = 58.35:15.88:25.77) | $Ti_2AlC$ | 1.5 |
| 25 | 78 | 22 | TiCrCN, ($TiO_2$: $Cr_2O_3$: C = 55.99:17.80:26.21) | $Ti_2AlC$ | 1.5 |
| 26 | 78 | 22 | TiCrCN, ($TiO_2$: $Cr_2O_3$: C = 52.45:24.38:23.17) | $Ti_2AlC$ | 1.5 |
| 27 | 78 | 22 | TiHfCN, ($TiO_2$:$HfO_3$: C = 51.47:25.11:23.42) | $Ti_2AlC$ | 1.5 |
| 28 | 67 | 33 | TiNbCN, ($TiO_2$:$Nb_2O_5$: C = 51.53:26.39:22.08) | Al | 2.5 |

TABLE 2-2

| Specimen No. | cBN Grains (volume %) | Binder Phase (volume %) | Cubic Boron Nitride Sintered Material ||||| Average Grain Size of Second Binder Grains (μm) | Mass Ratio of First Binder Grains: Second Binder Grains (Mass Ratio) ||  Evaluation Distance (km) |
|---|---|---|---|---|---|---|---|---|---|---|---|
| | | | First Binder Grains || Second Binder Grains ||| Other Composistions in Binder Phase | | First Binder Grains (%) | Second Binder Grains (Mass Ratio) | |
| | | | Composition | M1 Ratio (%) | Composition | M2 Ratio (%) | | | | | | |
| 15 | 67 | 33 | TiCrCN | 5 | TiCrCN | 15 | TiB$_2$, AlN, Al$_2$O$_3$ | 0.5 | 70 | 70:30 | 2.55 |
| 16 | 67 | 33 | TiVCN | 5 | TiVCN | 15 | TiB$_2$, AlN, Al$_2$O$_3$ | 0.5 | 70 | 70:30 | 2.45 |
| 17 | 74 | 26 | TiNbCN | 5 | TiNbCN | 15 | TiB$_2$, AlN, Al$_2$O$_3$ | 0.5 | 70 | 70:30 | 3.6 |
| 18 | 40 | 60 | TiNbCN | 5 | TiNbCN | 15 | TiB$_2$, AlN, Al$_2$O$_3$ | 0.5 | 70 | 70:30 | 3.4 |
| 19 | 78 | 22 | TiNbCN | 5 | TiNbCN | 15 | TiB$_2$, AlN, Al$_2$O$_3$ | 0.5 | 70 | 70:30 | 2.85 |
| 20 | 22 | 78 | TiNbCN | 5 | TiNbCN | 15 | TiB$_2$, AlN, Al$_2$O$_3$ | 0.5 | 70 | 70:30 | 2 |
| 21 | 85 | 15 | TiNbCN | 5 | TiNbCN | 15 | TiB$_2$, AlN, Al$_2$O$_3$ | 0.5 | 70 | 70:30 | 1.3 |
| 22 | 15 | 85 | TiNbCN | 5 | TiNbCN | 15 | TiB$_2$, AlN, Al$_2$O$_3$ | 0.5 | 70 | 70:30 | 0.9 |
| 23 | 78 | 22 | TiCrCN | 5 | TiCrCN | 15 | TiB$_2$, AlN, Al$_2$O$_3$ | 0.25 | 96 | 96:4 | 2.45 |
| 24 | 78 | 22 | TiCrCN | 5 | TiCrCN | 15 | TiB$_2$, AlN, Al$_2$O$_3$ | 0.5 | 96 | 96:4 | 2.5 |
| 25 | 78 | 22 | TiCrCN | 5 | TiCrCN | 15 | TiB$_2$, AlN, Al$_2$O$_3$ | 0.5 | 92 | 92:8 | 2.51 |
| 26 | 78 | 22 | TiCrCN | 5 | TiCrCN | 15 | TiB$_2$, AlN, Al$_2$O$_3$ | 0.5 | 70 | 70:30 | 2.53 |
| 27 | 78 | 22 | TiHfCN | 5 | TiHfCN | 15 | TiB$_2$, AlN, Al$_2$O$_3$ | 0.5 | 70 | 70:30 | 2.55 |
| 28 | 67 | 33 | — | — | TiNbCN | 15 | TiB$_2$, AlN, Al$_2$O$_3$ | 0.2 | 0 | 0:100 | 0.65 |

TABLE 3-1

| Specimen No. | cBN Powder (volume %) | Binder Powder (volume %) | Binder Powder Main Binder Powder Mixing Ratio of Source Material Powders (weight %) | Sub-Bnder Powder | Pulverization Time (hour) |
|---|---|---|---|---|---|
| 29 | 67 | 33 | TiNbCN, (TiO$_2$: Cr$_2$O$_3$: C = 57.19:16.79:26.02) | Ti$_2$AlC | 1.5 |
| 30 | 67 | 33 | TiNbCN, (TiO$_2$: V$_2$O$_5$: C = 57.19:16.79:26.02) | Ti$_2$AlC | 1.5 |
| 31 | 67 | 33 | TiNbCN, (TiO$_2$: Nb$_2$O$_5$: C = 57.19:16.79:26.02) | Ti$_2$AlC | 1.5 |
| 32 | 67 | 33 | TiNbCN, (TiO$_2$: Nb$_2$O$_5$: C = 70.49:2.39:27.12) | Ti$_2$AlC | 1.5 |
| 33 | 67 | 33 | TiNbCN, (TiO$_2$: Nb$_2$O$_5$: C = 57.19:16.79:26.02) | Ti$_2$AlC | 1.0 |
| 34 | 67 | 33 | TiNbCN, (TiO$_2$: Nb$_2$O$_5$: C = 57.19:16.79:26.02) | Ti$_2$AlC | 0.5 |
| 35 | 67 | 33 | TiNbCN, (TiO$_2$: Nb$_2$O$_5$: C = 57.19:16.79:26.02) | Ti$_2$AlC | 1.2 |
| 36 | 67 | 33 | TiAlCN, (TiO$_2$: Nb$_2$O$_5$: C = 57.19:16.79:26.02) | Ti$_2$AlC | 1.5 |

TABLE 3-2

| | | | Cubic Boron Nitride Sintered Material | | | | | | | | |
|---|---|---|---|---|---|---|---|---|---|---|---|
| | | | First Binder Grains | | Second Binder Grains | | | | | Mass Ratio of First Binder Grains: | |
| Specimen No. | cBN Grains (volume %) | Binder Phase (volume %) | Composition | M1 Ratio (%) | Composition | M2 Ratio (%) | Other Compositions in Binder Phase | Average Grain Size of Second Binder Grains (μm) | First Binder Grains (%) | Second Binder Grains (Mass Ratio) | Evaluation Distance (km) |
| 29 | 67 | 33 | TiNbCN | 0.01 | TiNbCN | 15 | TiB₂, AlN, Al₂O₃ | 0.5 | 70 | 70:30 | 3.55 |
| 30 | 67 | 33 | TiNbCN | 9 | TiNbCN | 15 | TiB₂, AlN, Al₂O₃ | 0.5 | 70 | 70:30 | 3.45 |
| 31 | 67 | 33 | TiNbCN | 5 | TiNbCN | 10 | TiB₂, AlN, Al₂O₃ | 0.5 | 70 | 70:30 | 3.52 |
| 32 | 67 | 33 | TiNbCN | 5 | TiNbCN | 80 | TiB₂, AlN, Al₂O₃ | 0.5 | 70 | 70:30 | 3.48 |
| 33 | 67 | 33 | TiNbCN | 5 | TiNbCN | 15 | TiB₂, AlN, Al₂O₃ | 1.0 | 70 | 70:30 | 3.46 |
| 34 | 67 | 33 | TiNbCN | 5 | TiNbCN | 15 | TiB₂, AlN, Al₂O₃ | 2.0 | 70 | 70:30 | 0.8 |
| 35 | 67 | 33 | TiNbCN | 5 | TiNbCN | 15 | TiB₂, AlN, Al₂O₃ | 0.8 | 70 | 70:30 | 3.48 |
| 36 | 67 | 33 | TiAlCN | 5 | TiAlCN | 15 | TiB₂, AlN, Al₂O₃ | 0.5 | 70 | 70:30 | 3.52 |

<<Review>>

The cBN sintered materials of Specimens 1, 2, 5 to 20, 23 to 27, 29 to 35, and 36 correspond to examples of the present disclosure. It was confirmed that when the cBN sintered material of each of these specimens is used as a tool material, an excellent tool life was exhibited even in high-efficiency processing of a high-strength hardened steel.

The cBN sintered material of Specimen 3, in which the average grain size of the second binder grains was 0.1 µm, corresponds to a comparative example. When the cBN sintered material of Specimen 3 was used as a tool material, the tool life was shorter than that of each of the examples of the present disclosure.

The cBN sintered material of Specimen 4, in which the ratio of the number of atoms of the first metal element in the second binder grain was 2%, corresponds to a comparative example. When the cBN sintered material of Specimen 4 was used as a tool material, the tool life was shorter than that of each of the examples of the present disclosure.

The cBN sintered material of Specimen 21, in which the content ratio of the cBN grains is 85 volume %, corresponds to a comparative example. When the cBN sintered material of Specimen 21 was used as a tool material, the tool life was shorter than that of each of the examples of the present disclosure.

The cBN sintered material of Specimen 22, in which the content ratio of the cBN grain is 15 volume %, corresponds to a comparative example. When the cBN sintered material of Specimen 22 was used as a tool material, the tool life was shorter than that of each of the examples of the present disclosure.

The cBN sintered material of Specimen 28, which does not include the first binder grains, corresponds to a comparative example. When the cBN sintered material of Specimen 28 was used as a tool material, the tool life was shorter than that of each of the examples of the present disclosure.

The cBN sintered material of Specimen 34, in which the average grain size of the second binder grains was 2.0 µm, corresponds to a comparative example. When the cBN sintered material of Specimen 34 was used as a tool material, the tool life was shorter than that of each of the examples of the present disclosure.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A cubic boron nitride sintered material comprising: more than or equal to 20 volume % and less than or equal to 80 volume % of cubic boron nitride grains; and more than or equal to 20 volume % and less than or equal to 80 volume % of a binder phase, wherein the binder phase includes first binder grains and second binder grains, each of the first binder grains and the second binder grains includes one compound composed of titanium, at least one first metal element selected from a group consisting of zirconium, hafnium, a group 5 element, a group 6 element in a periodic table, and aluminum, and one or both of nitrogen and carbon, in each of the first binder grains, a ratio of the number of atoms of the first metal element to a total of the number of atoms of the titanium and the number of atoms of the first metal element is more than or equal to 0.01% and less than 10%, in each of the second binder grains, a ratio of the number of atoms of the first metal element to a total of the number of atoms of the titanium and the number of atoms of the first metal element is more than or equal to 10% and less than or equal to 80%, and an average grain size of the second binder grains is more than or equal to 0.2 µm and less than or equal to 1 µm, wherein a ratio of a mass of the first binder grains to a total mass of the first binder grains and the second binder grains is more than or equal to 10% and less than or equal to 95%.

2. The cubic boron nitride sintered material according to claim 1, wherein the average grain size of the second binder grains is more than or equal to 0.25 µm and less than or equal to 0.7 µm.

3. The cubic boron nitride sintered material according to claim 1, wherein a ratio of a mass of the first binder grains to a total mass of the first binder grains and the second binder grains is more than or equal to 50% and less than or equal to 80%.

4. The cubic boron nitride sintered material according to claim 1, wherein the first metal element consists of at least one metal element selected from a group consisting of zirconium, hafnium, niobium, tantalum, molybdenum, and tungsten.

5. The cubic boron nitride sintered material according to claim 1, wherein the first metal element consists of one or both of zirconium and niobium.

6. The cubic boron nitride sintered material according to claim 1, wherein a content ratio of the cubic boron nitride grains is more than or equal to 35 volume % and less than or equal to 75 volume %.

* * * * *